United States Patent
Kobayashi et al.

(10) Patent No.: US 7,197,606 B2
(45) Date of Patent: Mar. 27, 2007

(54) INFORMATION STORING METHOD FOR COMPUTER SYSTEM INCLUDING A PLURALITY OF COMPUTERS AND STORAGE SYSTEM

(75) Inventors: Ikuko Kobayashi, Kawasaki (JP); Shinji Kimura, Sagamihara (JP); Ayumi Mikuma, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/917,302

(22) Filed: Aug. 13, 2004

(65) Prior Publication Data

US 2005/0283575 A1    Dec. 22, 2005

(30) Foreign Application Priority Data

Jun. 22, 2004   (JP)   ............................. 2004-183873

(51) Int. Cl.
*G06F 12/00*   (2006.01)
(52) U.S. Cl. .......................... 711/147; 712/2
(58) Field of Classification Search ...................... None
See application file for complete search history.

(56) References Cited

U.S. PATENT DOCUMENTS

| | | | |
|---|---|---|---|
| 6,061,773 A | 5/2000 | Harvey et al. | |
| 6,148,387 A | 11/2000 | Galasso et al. | |
| 6,286,087 B1 | 9/2001 | Ito et al. | |
| 6,343,324 B1 | 1/2002 | Hubis et al. | |
| 6,421,711 B1 | 7/2002 | Blumenau et al. | |
| 6,507,905 B1 | 1/2003 | Hubacher et al. | |
| 6,691,213 B1* | 2/2004 | Luu et al. | 711/163 |
| 6,751,658 B1 | 6/2004 | Haun et al. | |
| 6,775,830 B1 | 8/2004 | Matsunami et al. | |
| 6,813,522 B1* | 11/2004 | Schwarm et al. | 700/5 |
| 6,820,168 B2 | 11/2004 | Tanaka et al. | |
| 6,857,041 B2 | 2/2005 | LeClerg | |
| 7,051,165 B2 | 5/2006 | Kimura et al. | |
| 2002/0016891 A1* | 2/2002 | Noel et al. | 711/153 |
| 2003/0126242 A1 | 7/2003 | Chang | |
| 2003/0217123 A1 | 11/2003 | Anderson et al. | |

(Continued)

FOREIGN PATENT DOCUMENTS

JP     2000-259583     9/2000

OTHER PUBLICATIONS

Cisco Network Boot Installation and Configuration Guide, Release 2.1, 2002.

*Primary Examiner*—Hyung Sough
*Assistant Examiner*—Craig E Walter
(74) *Attorney, Agent, or Firm*—Mattingly, Stanger, Malur & Brundidge, P.C.

(57) ABSTRACT

A computer 10a stores boot information OA1 and application information AP1 stored on a local disk 16a, the information being respectively stored as an OS1 shared file group in a shared LU1 and as a AP1 shared file group in a shared LUn+1. For personal information (including personal information of boot information or AP information), computer 10a stores the information as a user personal file group in an personal LU1. Computer 10a transmits image outline information, LU information and file information for the sets of information stored in shared LU1, shared LUn+1 and personal LU1 to an disk-image management server 30, where the information is stored in the storage device 31 of the disk-image management server 30.

13 Claims, 15 Drawing Sheets

U.S. PATENT DOCUMENTS

| | | |
|---|---|---|
| 2004/0015522 A1 | 1/2004 | Hensbergen |
| 2004/0139309 A1* | 7/2004 | Gentil et al. .................. 713/1 |
| 2004/0186898 A1 | 9/2004 | Kumura et al. |
| 2004/0186961 A1 | 9/2004 | Kimura et al. |
| 2005/0021727 A1 | 1/2005 | Matsunami et al. |
| 2005/0138287 A1 | 6/2005 | Ogasawara et al. |

* cited by examiner

Fig.4

User LU information

| Computer identifying information | Boot LU_ID | AP_LU_ID | Personal LU_ID |
|---|---|---|---|
| Address A | 1 | — | 1 |
| Address B | 1 | 3 | 2 |
| Address C | 2 | 1, 2 | 3 |
| ⋮ | ⋮ | ⋮ | ⋮ |

Fig.5

Boot LU information

| ID | Image outline information | LU information | File information |
|---|---|---|---|
| 1 | OS1, Ver.1 | TargetA, LU1, IP address | |
| 2 | OS2, Ver.1 | TargetA, LU2, IP address | |
| 3 | OS3, Ver.2 | TargetB, LU1, IP address | |
| ⋮ | ⋮ | ⋮ | ⋮ |

| File name | Unique information |
|---|---|
| F1 | 1 |
| F2 | 20 |
| F3 | 34 |

Personal LU information

| ID | LU information |
|----|----------------|
| 1 | TargetA, LU5, IP address |
| 2 | TargetA, LU6, IP address |
| 3 | TargetB, LU3, IP address |
| ⋮ | ⋮ |

INFORMATION STORING METHOD FOR COMPUTER SYSTEM INCLUDING A PLURALITY OF COMPUTERS AND STORAGE SYSTEM

CROSS-REFERENCE TO RELATED APPLICATION

This application relates to and claims priority from Japanese Patent Application No. 2004-183873, filed on Jun. 22, 2004, the entire disclosure of which is incorporated by reference.

BACKGROUND

The disclosure herein relates to a computer system comprising a plurality of computers, and one or a plurality of storage devices shared by the plurality of computers, and to a technique for sharing information in a computer system.

To date, there have been proposed techniques for integrating the local disks of individual computers into storage devices disposed on a network (see Unexamined Patent Application 2000-259583). That is, the operating system (OS) and application programs (AP) used by individual computers are installed in a logical unit (LU) of a storage device, rather than on local disks. According to this technology, it is possible to execute all at once on a storage device maintenance processes that, in the past, necessary to be performed separately on the local disk of each individual computer, such as periodic data backup, virus scans, and the like.

SUMMARY

However, since according to the prior art described above the operating system and application programs originally stored on the local disks of computers are copied to the logical unit of a storage device, there are a number of drawbacks, such as: the memory capacity required of the storage device is quite large; considerable time is required to format a boot disk; there are duplicate logical units storing the same operating system and application programs; updates of various kinds must be performed on a unit-by-unit basis for each personal logical unit; and installation of new application programs must be carried out on a unit-by-unit basis for each personal logical unit.

In a first aspect thereof intended to address such problems provides an information storing method for a storage device, the device being connected with a plurality of computers via a network, and comprising a shared storage area for storing shared information shared by said plurality of computers, and personal storage areas for storing personal information used individually by each of said plurality of computers. The information storing method for a storage device according to this first aspect comprises acquiring said shared information and said personal information from storage module of a said computer; extracting shared information that is not currently stored in said shared storage area from the shared information acquired from said storage module, shared storage area if a shared storage area that is capable of storing shared information of the same type as the acquired said shared information has been formatted in said storage device; and storing said extracted shared information and said personal information acquired from said storage module in said personal storage area of said storage device.

According to the information storing method for a storage device pertaining to the first aspect, where there has been formatted in a storage device a shared storage area capable of storing shared information of the same type as shared information acquired from storage module, there is extracted from the shared information acquired from the storage module shared information that is not yet stored in the shared storage area; and information consisting of this extracted shared information and personal information acquired from the storage module is stored in the personal storage area of the storage device, whereby efficiency of storage of information of various kinds in a storage device connected with a plurality of computers may be improved.

The information storing method for a storage device pertaining to the first aspect may additionally comprise the step of formatting said shared storage area in said storage device, if a shared storage area that is capable of storing shared information of the same type as said shared information acquired from said storage module has not been formatted in said storage device; and storing said shared information acquired from said storage module in the formatted said shared storage area.

According to the information storing method for a storage device pertaining to the first aspect, where there has not been formatted in a storage device a shared storage area capable of storing shared information, a shared storage area is formatted so that shared information acquired from storage module can be stored in the shared storage area so formatted.

In a second aspect thereof provides an information storing method for a storage device in a computer system, the system comprising a plurality of computers and a shared information storage device shared by the plurality of computers. The information storing method for a storage device pertaining to the second aspect herein comprises the steps of: determining whether a boot information storage area has been formatted in said storage device using disk-image management information that indicates storage status of various kind of information in said storage device, wherein the boot information storage area stores boot information used when booting a computer, wherein said boot information is stored on one computer among said plurality of computers; determining whether an application information storage area has been formatted in said storage device using said disk-image management information, wherein the application information storage area stores application information used for execution of an application by the computer, wherein the application information is stored on said one computer; formatting an personal storage area for storing personal information in said storage device, wherein is the personal information is unique to the operating environment of each computer and is stored on said one computer; storing information that is stored in said computer and is not currently stored in said boot information storage area in said personal storage area, if said boot information storage area has been formatted; storing information that is stored in said computer and is not currently stored in said application information storage area in said personal storage area, if said application information storage area has been formatted; storing said personal information in said formatted personal storage area; and reflecting in said disk-image management information the storage status of information in said storage areas.

According to the information storing method for a storage device pertaining to the second aspect, information that, of boot information stored in a computer, has yet to be stored in the boot information storage area, information that, of application information stored in a computer, has yet to be stored in the application information storage area, and personal information are stored in an personal storage area, whereby efficiency of storage of information of various kinds in a storage device connected with a plurality of computers may be improved.

In the information storing method for a storage device pertaining to the second aspect, each set of said information may be composed of one or a plurality of files; said information storing method may further comprise the step of, when storing said boot information and said application information in said boot information storage area and said application information storage area respectively, a unique identifier is allocated to each file making up said boot information and said application information respectively; extraction of information not currently stored in said boot information storage area and said application information storage area from boot information and application information stored on said computer may be carried out in said file units using said identifiers; and storage of said various sets of information may be carried out by means of copying or moving in said file units the various information stored on said computer.

In this case, it becomes possible to easily and accurately extract information not currently stored in the boot information storage area or application information storage area from boot information and application information.

The method pertaining to the first or second aspects herein may also be realized as a program for execution by a computer, or a computer readable storage medium having such a program stored therein.

BRIEF DESCRIPTION OF THE DRAWINGS

FIG. 4 shows an example of user logical unit information.

FIG. 5 shows an example of boot logical unit information.

DETAILED DESCRIPTION OF THE PREFERRED EMBODIMENTS

The following description of the embodiments of a computer system and information storing method in the computer system makes reference to the accompanying drawings.

Figure 1:
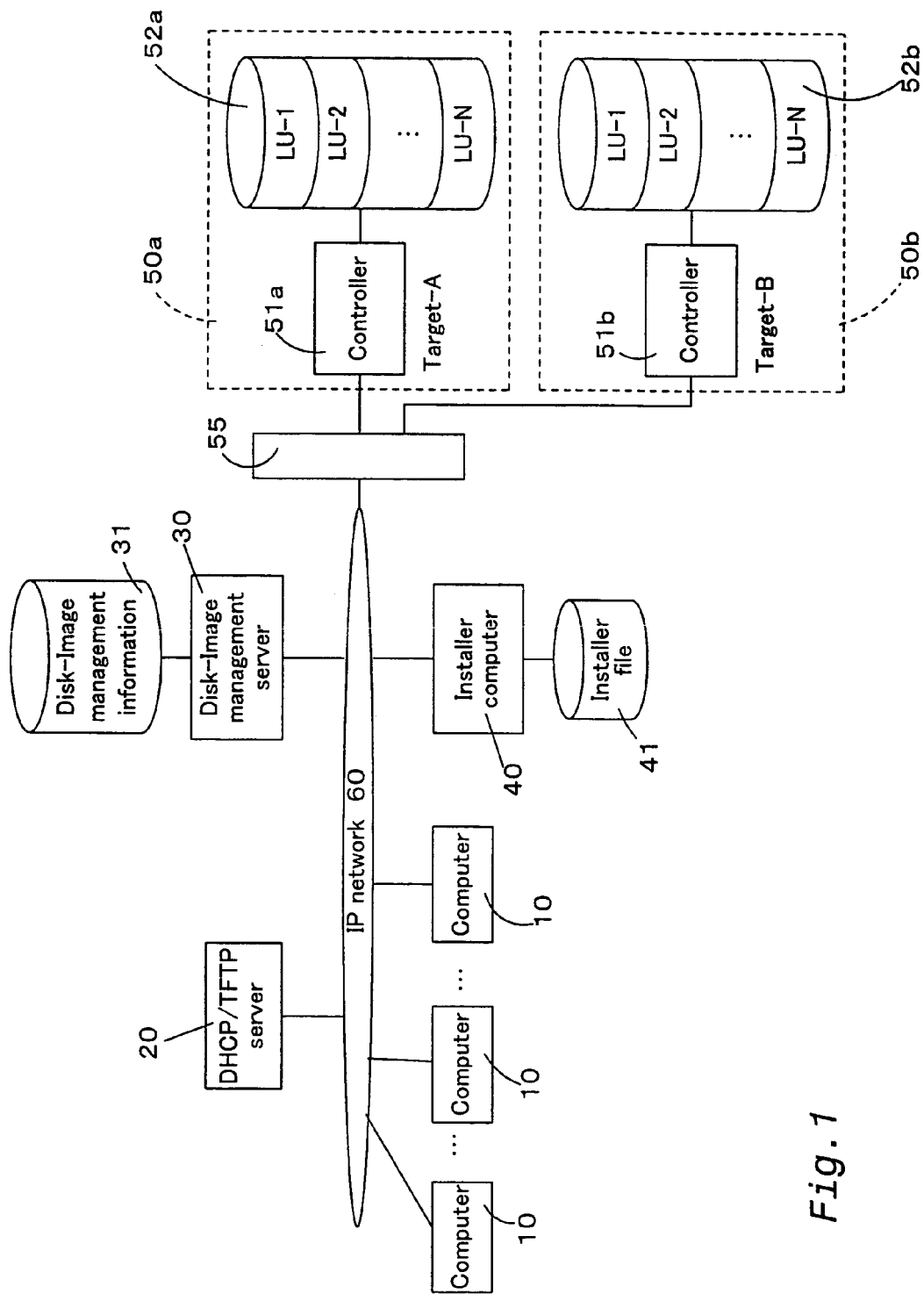
FIG. 1 shows generally an exemplary arrangement of a computer system pertaining to the embodiment.
Figure 2:
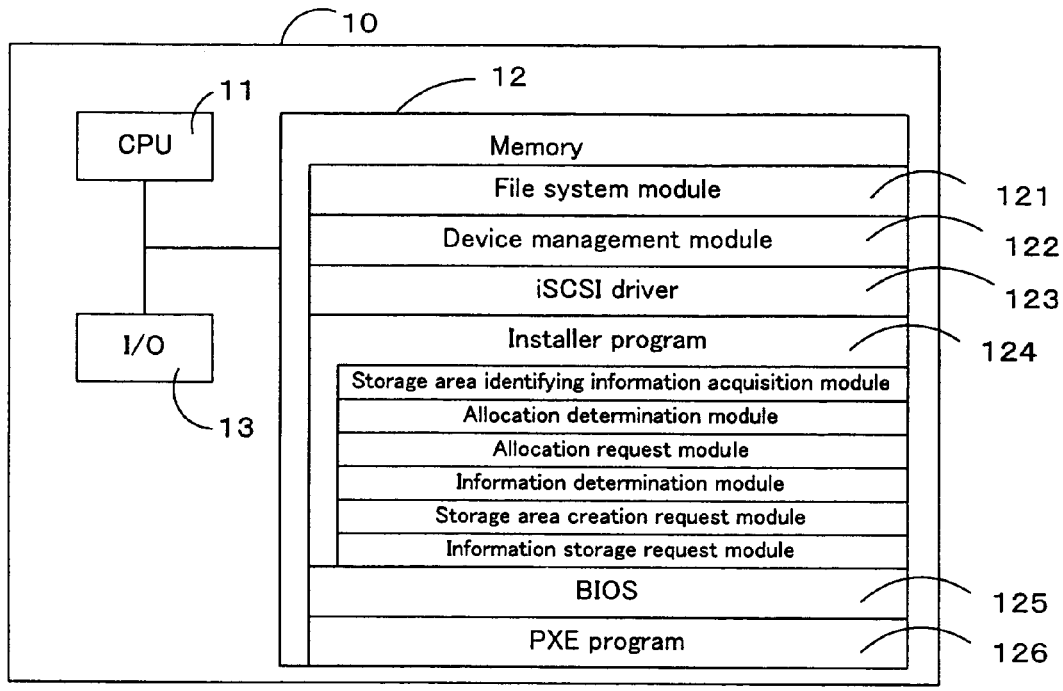
FIG. 2 shows generally an internal arrangement of a computer making up part of a computer system pertaining to the embodiment.
Figure 3:
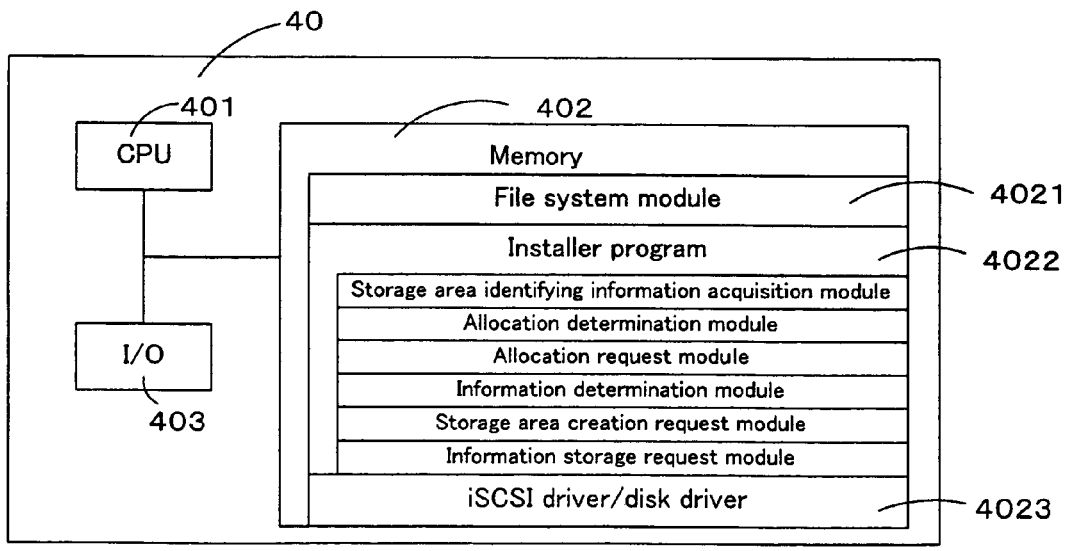
FIG. 3 shows generally an internal arrangement of an installer computer making up part of a computer system pertaining to the embodiment.

The description of the general arrangement of a computer system pertaining to the embodiment makes reference to FIGS. 1–3. FIG. 1 is an illustration showing generally an exemplary arrangement of a computer system pertaining to the embodiment. FIG. 2 is a functional block diagram showing generally an internal arrangement of a computer making up part of a computer system pertaining to the embodiment. FIG. 3 is a functional block diagram showing generally an internal arrangement of an installer computer making up part of a computer system pertaining to the embodiment.

The computer system 100 shown in FIG. 1 comprises a plurality of computers 10, a DHCP/TFTP server 20, an disk-image management server 30, an installer computer 40, and storage devices 50a, 50b, all of which are interconnected via an IP network 60. In the embodiment, there is configured an SAN (Storage Area Network) using IP-SAN that enables data transfer over an existing IP network. The communications protocol is the iSCSI protocol, for transmitting SCSI data over IP network 60.

Each computer 10 can be a diskless computer having no internal storage device, e.g. a hard disk drive, or an ordinary computer equipped with a hard disk drive. However, where a computer 10 is equipped with a hard disk drive, once the contents recorded on the hard disk drive have been moved to storage devices 50a, 50b by means of the information storing method pertaining to the embodiment, the hard disk drive is no longer used during operation of the computer 10, which is used in a manner analogous to a diskless computer. That is, computers 10 used in the embodiment are computers that use storage devices 50a, 50b as storage devices via the network, and may include not only diskless computers, but also computers requiring no local storage device during operation of computers 10. Stored contents on a hard disk drive may include boot information necessary to boot up the operating system on a computer 10, application information necessary to execute an application, and personal information unique to the operating environment of a computer 10. Such personal information could include data created by applications, drivers, desktop arrangement, and other customized information.

As shown in FIG. 2 each computer 10 comprises a CPU 11 for executing programs and modules, memory 12 for storing a network boot program and other programs and modules, and an I/O port 13 enabling communication via network 60. In memory 12 are stored a file system module 121 for performing conversion between logical addresses and physical addresses to enable access in file units to storage devices 50a, 50b; a device management module 122 and iSCSI driver 123 able to handle a number of logical units as a single logical unit; BIOS 125 for booting the computer 10; a PXE (Preboot eXecution Environment) program 126 enabling network booting; and other drivers.

The DHCP/TFTP server 20 stores boot information needed for network booting of computers 10, specifically, the IP address to be used by a computer 10, IP address of the DHCP/TFTP server 20, boot loader program name, IP address of the network router 55, and Boot-LU information in boot logical unit information storing a boot image for a computer 10, described later. In response to a request of the PXE program executed by the BIOS at startup of a computer 10, the DHCP/TFTP server 20 transmits the above information to the computer 10.

Figures 6, 7:
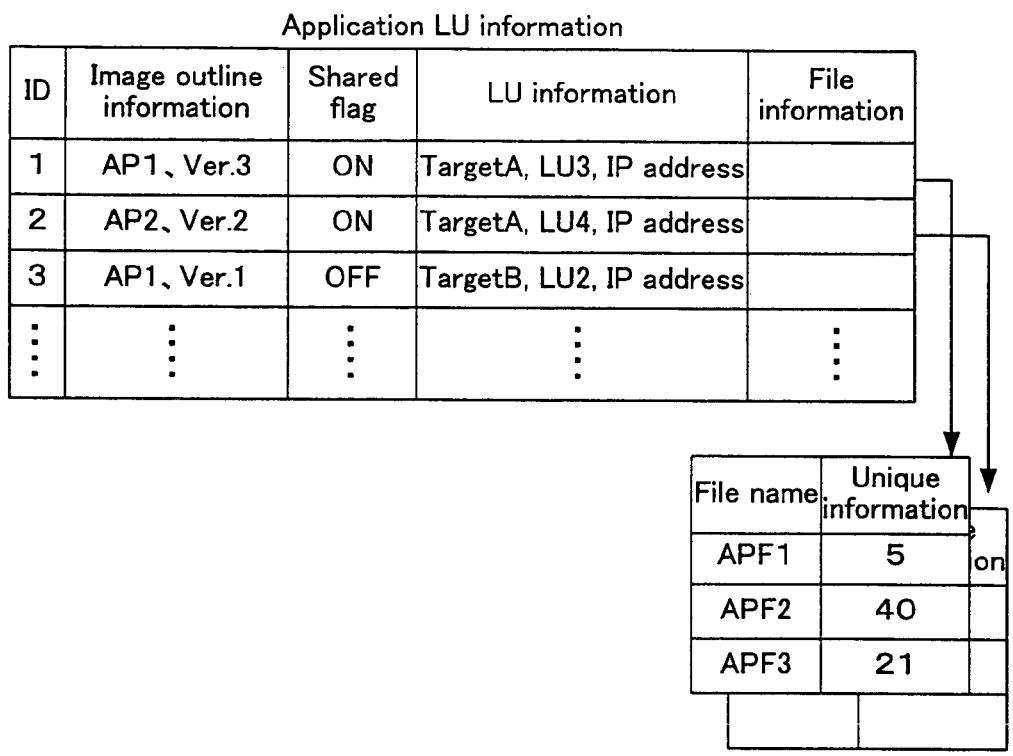
FIG. 6 shows an example of AP logical unit information.
FIG. 7 shows an example of personal logical unit information.

The disk-image management server 30 comprises a storage device 31 for storing administrative information. Administrative information includes user logical unit information, boot logical unit information, application (AP) logical unit information, and personal logical unit information. Description of specific examples of these items of information makes reference to FIGS. 4–7. FIG. 4 is an illustration showing an example of user logical unit information. FIG. 5 is an illustration showing an example of boot logical unit information. FIG. 6 is an illustration showing an example of AP logical unit information. FIG. 7 is an illustration showing an example of personal logical unit information.

User logical unit information contains stored information identifying each computer 10; in the example of FIG. 4, an address is allocated to each computer 10, and to each address are allocated a boot LU_ID identifying a boot logical unit, an AP_LU_ID identifying an AP logical unit, and an personal LU_ID identifying an personal logical unit. The computer allocated address A has been allocated a boot LU_ID and an personal LU_ID, but has not been allocated an AP_LU_ID. The computer allocated address B has been allocated a boot LU_ID, an AP_LU_ID and an personal LU_ID. The computer allocated address C has been allocated a boot LU_ID, an AP_LU_ID and an personal LU_ID, with two AP_LU_IDs being allocated to it. While it is not typical for a given computer 10 to run two different operating systems, it is typical to run a number of different applications, and thus a single computer, i.e. an address, can be allocated a number of AP_LU_IDs. Each ID may have any format that enables identification of a particular logical unit.

Boot logical unit information contains stored information relating to the operating system stored in each boot logical unit; in the example of FIG. 5, a boot LU_ID is allocated to each boot logical unit, and for each boot LU_ID there is stored image outline information indicating the contents of boot information, LU information identifying each boot logical unit, and file information stored in each boot logical unit.

Image outline information indicates the stored operating system name (e.g. OS1, OS2) and version; LU information indicates the device name (e.g. TargetA), logical unit name (LUN: e.g. LU1, LU2), and IP address. File information additionally indicates the file name (e.g. F1, F2) and unique information uniquely identifying a file name (e.g. 1, 20). Here, file refers to a file which is an information unit used in an operating system program, for example. Unique information may consist of an integral value arrived at by analyzing file data to calculate a hash value, for example. Accordingly, in the case of a same given file, the unique information imparted thereto will be the same.

AP logical unit information contains stored information relating to application programs stored in each AP logical unit; in the example of FIG. 6, an AP_LU_ID is allocated to each AP logical unit, and for each AP_LU_ID there is stored image outline information indicating the contents of AP information, LU information identifying each AP logical unit, and file information stored in each AP logical unit.

Image outline information indicates stored application name (e.g. AP1, AP2) and version; LU information indicates the device name (e.g. TargetA), logical unit name (LUN: e.g. LU1, LU2), and IP address. File information additionally indicates the file name (e.g. APF1, APF2) and unique information uniquely identifying a file name (e.g. 5, 40). Here, file refers to a file which is an information unit used in an operating system program, for example. Unique information may consist of an integral value arrived at by analyzing file data to calculate a hash value, for example. Accordingly, in the case of a same given file, the unique information imparted thereto will be the same.

Personal logical unit information contains stored personal information stored for each personal logical unit; in the example of FIG. 7, an personal LU_ID is allocated to each personal logical unit, and LU information identifying each personal logical unit is stored. LU information indicates the device name (e.g. TargetA), logical unit name (LUN: e.g. LU1, LU2), and IP address. That is, personal information is not information of a nature that would be shared among the plurality of computers 10, nor is it modified on an as-needed basis by the user (operating environment) making it inadaptable for shared usage; accordingly, only LU information is included. In other words, image outline information and file information represent information necessary for shared usage without duplicate information.

The installer computer 40 comprises a storage device 41 for storing files to be installed (stored) on the storage devices 50a, 50b. The installer computer 40 is a computer for installing onto the storage devices 50a, 50b files of boot information, application information, and personal information stored on the local disk of a computer 10. Alternatively, the installer computer 40 is a computer used for pre-installing desired boot information or application information on the storage devices 50a, 50b. The former could be a case in which, for example, in order to use an existing computer 10 as a diskless computer, information stored on the local disk of computer 10 is moved to the storage devices 50a, 50b. The latter could be a case in which, for example, a network boot environment is configured using a new diskless computer.

As shown in FIG. 3, the installer computer 40 comprises a CPU 401 for executing programs and modules, memory 402 for storing various programs and modules, and an I/O port 403 enabling communication via network 60. In memory 402 are stored a file system module 4021 for performing conversion between logical addresses and physical addresses to enable access in file units to storage devices 50a, 50b; an installer program 4022 for installing boot information, application information, and personal information stored on a local disk onto storage devices 50a, 50b; an iSCSI driver; and a disk driver 4023. The installer program 4022 includes a storage area identifying information acquisition module for acquiring information that identifies storage area for information in storage devices 50a, 50b, i.e. user logical unit information; a write request module for requesting writing of information to logical units; an allocation determination module for determining whether a logical unit has been allocated to information; an allocation request module for requesting allocation of a logical unit for information not currently allocated a logical unit; information determination modules for determining whether information is stored in storage devices 50a, 50b; and storage area creation request modules for requesting creation of a logical unit in order to store information in the event that the information is not stored in storage devices 50*a*, 50*b*. As will be described hereinbelow, the storage area identifying information acquisition module, write request module, allocation determination module, allocation request module, boot information determination module, application information determination module, personal storage area creation request module, personal information storage request module, boot information storage area creation request module, application information storage area creation request module, boot information storage request module, and application information storage request module are realized by means of CPU 401 executing the installer program 4022. "Allocation" of a logical volume is equivalent to "formatting" an information storage area.

Storage devices 50*a*, 50*b* each comprise a controller 51*a*, 51*b* and a storage volume 52*a*, 52*b* composed of several hard disk drives. In FIG. 1, while two storage devices are shown, there could instead be provided one, or three or more such storage devices. Storage devices 50*a*, 50*b* are interconnected via a fiber channel to form a storage device network.

In storage volumes 52*a*, 52*b* there are formed a plurality of logical units (information storage areas) LU-1–LU-N. On the basis of information administered by the disk-image management server 30, these logical units are allocated to boot information storage areas, application information storage areas, or personal storage areas that store boot information, application information or personal information used by computers 10. Through the use of LU information, logical units LU-1–LU-N in storage devices 50*a*, 50*b* are identified by means of a computer 10 or the installer computer 40.

Figure 8:
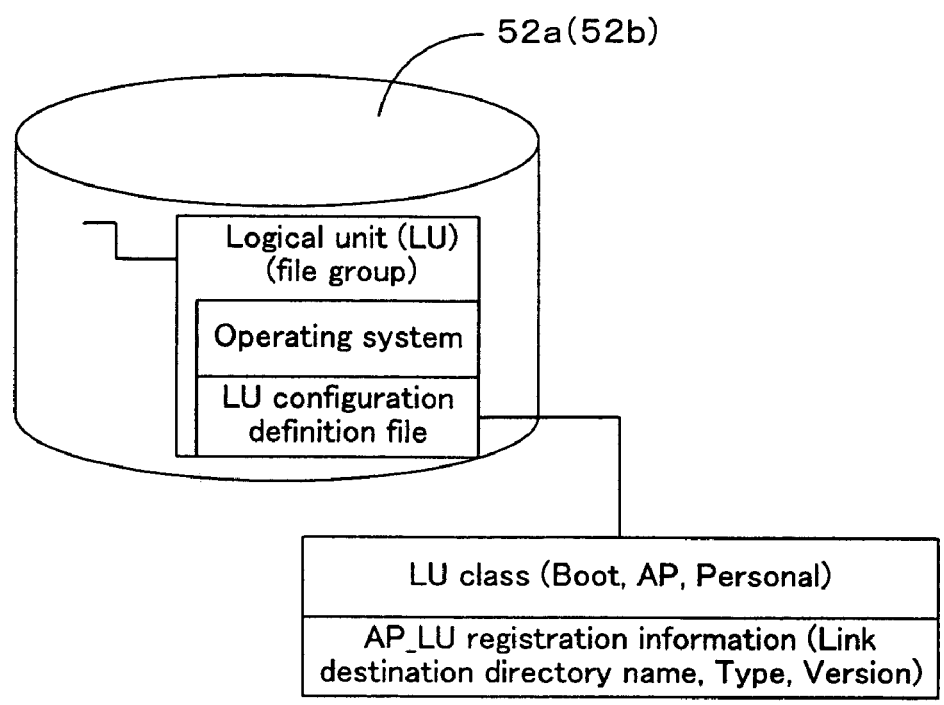
FIG. 8 shows an example of information stored in a logical volume in a storage device.

Each personal logical unit LU-1–LU-N utilized as a storage area for boot information or the like has stored therein an LU configuration definition file, which is a file that contains information indicating attributes of the LU and the like. FIG. 8 is an illustration showing an example of information stored in LUs. As noted, each logical unit has stored therein, in addition to files of the OS and the like, an LU configuration definition file that defines the configuration of the logical unit. In the LU configuration definition file are stored LU classification (boot, AP, individual) information indicating the classification of logical units stored in each storage volume 52, a link directory name for associating an AP logical unit with a specific operating system (boot information), and AP-LU registration information that includes registration information indicating the contents of an application stored in an AP logical unit, for example, the type and version thereof.

Controllers 51*a*, 51*b* have allocated thereto Target A and Target B as respective device names (ID). In response to an LU connection request (connection request to a logical unit) from a computer 10 or the installer computer 40, controller 51*a*, 51*b* connects to the computer 10 or the installer computer 40. In response to a write or read request from a computer 10 or the installer computer 40, controller 51*a*, 51*b* writes data (files) to or reads data from a logical unit LU.

In the embodiment, iSCSI is used as the data transfer format over the IP network 60, and a fiber channel is used as the data transfer format between storage devices 50*a*, 50*b*. Accordingly, a storage router 55 is disposed between the IP network 60 and the storage device network, in order to link up the IP network 60 and the storage device network.

Storage router 55 is provided with a routing table in which are registered iSCSI target names allocated to logical units (LU) of the storage devices 50*a*, 50*b*, and logical unit names (LUN). An iSCSI target name is composed, for example, of a device name (ID) and IP address for identifying a storage device. Naturally, in the event that storage devices 50*a*, 50*b* are interconnected by means of a network implemented according to the SCSI protocol, a storage router 55 will not be needed.

In network booting of a computer 10, the BIOS 125 reads the PXE (Preboot execution Environment) program 126 from ROM (memory 12), and runs it. The PXE program requests the DHCP/TFTP server 20 to transmit the allocation of the IP address to be used by computer 10, the IP address of the DHCP/TFTP server 20, the boot loader program name, the IP address of the network router 55, and LU information of the logical unit which stores the boot image of the computer 10. The PXE program downloads the boot loader program from the DHCP/TFTP server 20 and runs it. The boot loader program loads boot information from the relevant logical units of the storage devices 50*a*, 50*b*, i.e. the relevant SCSI targets, and starts up the operating system and iSCSI drivers to enable execution of application programs. After the operating system has started up, loading and running of application programs are executed in the same manner as acquisition of boot information, reading out of data in association with execution of application programs is executed for the boot information LU and AP information LU, and reading/writing of data from and to the personal information LU is executed. In the description hereinbelow, execution of processes by a program is actually carried out by a device which executes the program, for example, a controller or processor.

Figure 9:
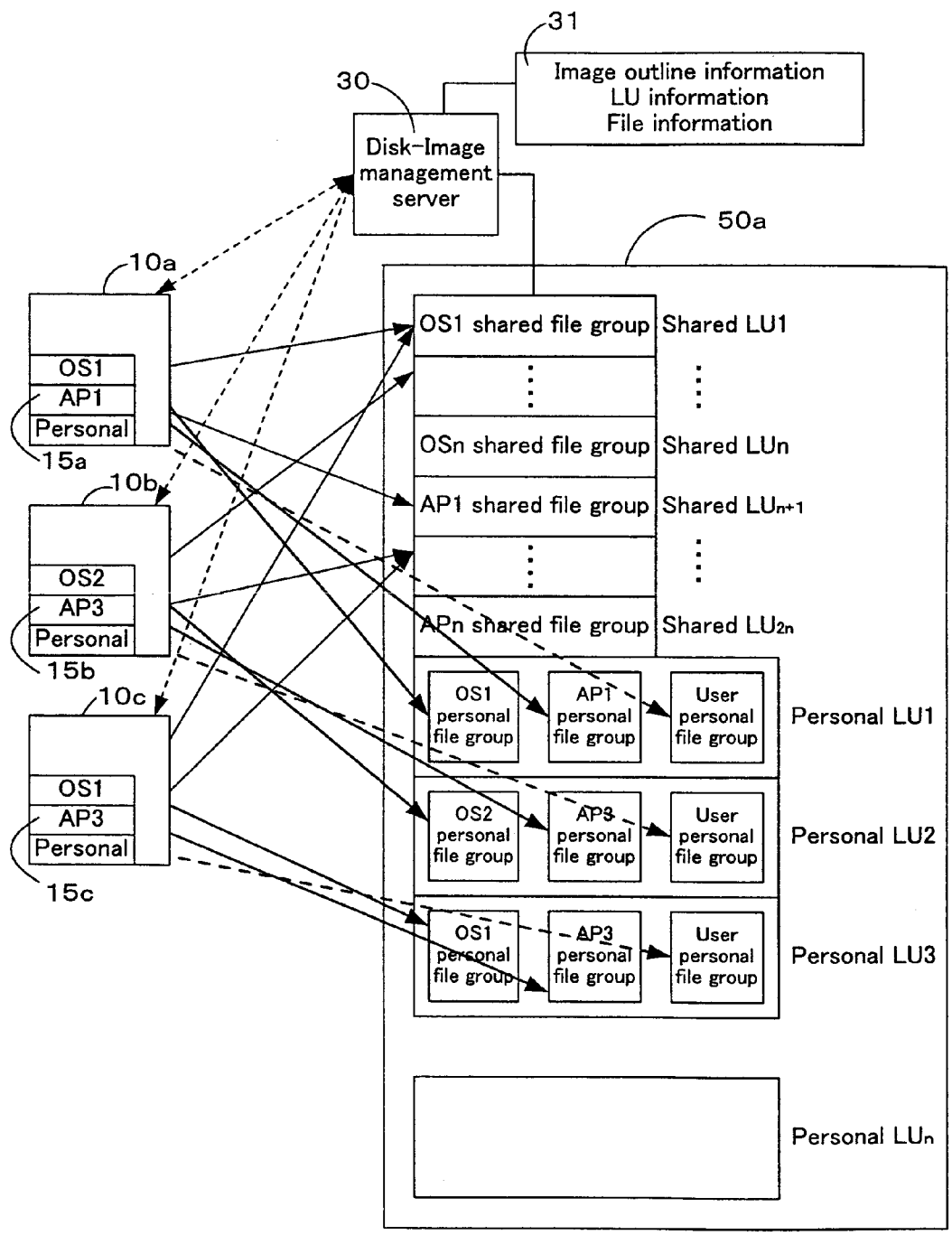
FIG. 9 is a simplified illustration of a procedure for migrating information stored on the local disk of a computer in the computer system pertaining to the embodiment.

The following brief description of a procedure for migrating information of various kinds stored on the local disk of a computer 10 in the computer system 10 pertaining to the embodiment makes reference to FIG. 9. FIG. 9 is a simplified illustration of a procedure for migrating information stored on the local disk of a computer in the computer system pertaining to the embodiment.

Computers 10*a*, 10*b*, 10*c* are respectively provided with local disks 15*a*, 15*b*, 15*c*. On local disks 15*a*, 15*b*, 15*c* are respectively stored boot information OS1 and application information AP1, boot information OS2 and application information AP3, and boot information OS1 and application information AP3. On storage device 50*a*, a boot information storage areas for storing shared use boot information, i.e. OS shared file groups, and application information storage areas for storing shared use application information, i.e. AP shared file groups are provided as shared logical units (shared LU1–LU2*n*); personal storage areas for storing individual boot information (OS personal file groups), individual application information (AP personal file groups), and user personal information (user personal file groups) are provided as personal logical units (personal LU1–LUn). Here, individual boot information is information customized by individual users such as desktop background, file display format, and other such operating system settings; individual application information is information customized by individual users such as text style and toolbar displays.

The status of each logical unit in storage device 50*a* is administered by disk-image management server 30. Disk-image management server 30 has image outline information, LU information and file information for each logical unit described above as disk-image management information in its storage device 31.

Migrating of information stored on the local disks of computers 10*a*–10*c* to the storage device 50*a* is carried out by means of execution of the installer program in the previously mentioned installer computer 40 or computers 10*a*–10*c*. In the example of FIG. 9, by means of the installer program, first, the boot information OS1 and application information AP1 stored on local disk 15a of computer 10a are stored respectively as the OS1 shared file group in shared LU1 and as the AP1 shared file group in LUn+1. For personal information (including personal information of boot information and AP information), the installer program stores these as user personal file groups in personal LU1. The installer program transmits to the disk-image management server 30 the image summary data, LU information and file information for the items of information stored in shared LU1, shared LUn+1 and personal LU1, which are then placed in the storage device 31 of the disk-image management server 30.

The installer program then stores in storage device 50a the information stored on local disk 15c in computer 10b. First, on the basis of disk-image management information stored in the storage device 31 of disk-image management server 30, the installer program determines whether boot information OS2 and application information AP3 stored on local disk 15b has already been stored in shared logical units of storage device 50a. In the example of FIG. 9, since boot information OS2 and application information AP3 stored on local disk 15b differ from the boot information OS1 and application information AP1 stored on local disk 15a, boot information OS2 and application information AP3 stored on local disk 15b is not yet stored in shared logical units of storage device 50a. Accordingly, the installer program takes the boot information OS2, application information AP3 and personal information that were stored on local disk 15b and stores these on local disk 15a in the same manner, while storing image outline information, LU information and file information for the stored information in storage device 31.

Next, the installer program takes the information stored on local disk 15c in computer 10c and stores it in storage device 50a. On the basis of disk-image management information stored in the storage device 31 of disk-image management server 30, the installer program determines whether the boot information OS1 and application information AP3 stored on local disk 15c has already been stored in shared logical units of storage device 50a. In the example of FIG. 9, boot information OS1 and application information AP3 stored on local disk 15c is identical to information stored on local disks 15a and 15b. Accordingly, for the boot information OS1 and application information AP3 stored on local disk 15c, the installer program does not execute migrating thereof to the storage device 50a. For the personal information, on the other hand, this is stored in personal LU 3 as the user personal file group together with the OS1 and AP3 file groups. When the installer computer 40 executes the installer program, as noted, either of two different processes is executed as needed, depending on whether new (information) storage areas are being formatted in a storage device, or an existing information storage area is being set to shared use. The two processes are described separately hereinbelow. The process for formatting new information storage areas is executed not only at times that individual computers are moved, but also in instances where a shared area or area for use by computers is established in a storage device (in which case there will be no personal information).

Figure 10:
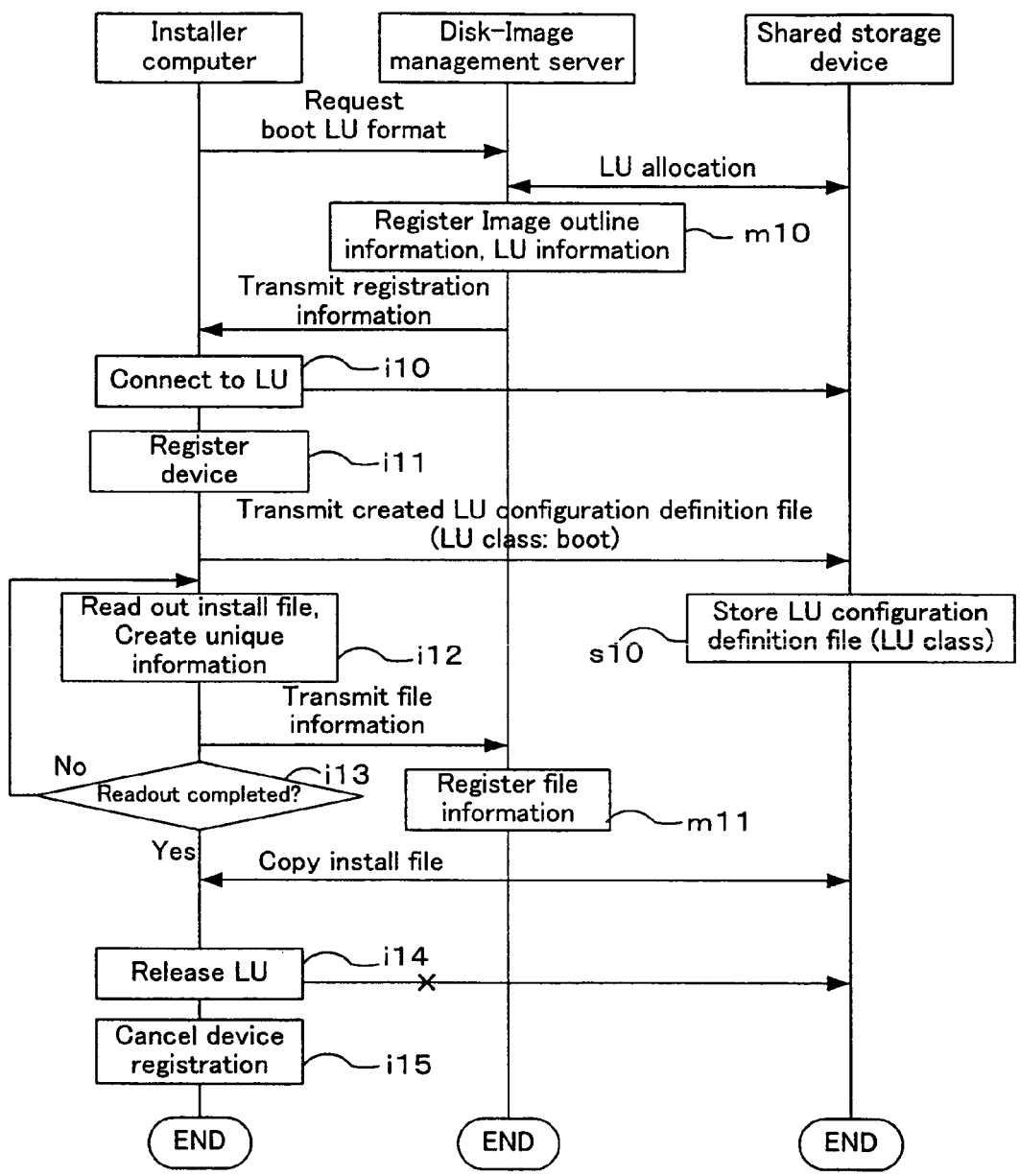
FIG. 10 is a flowchart of a processing routine for formatting a new boot information storage area in a storage device.
Figure 11:
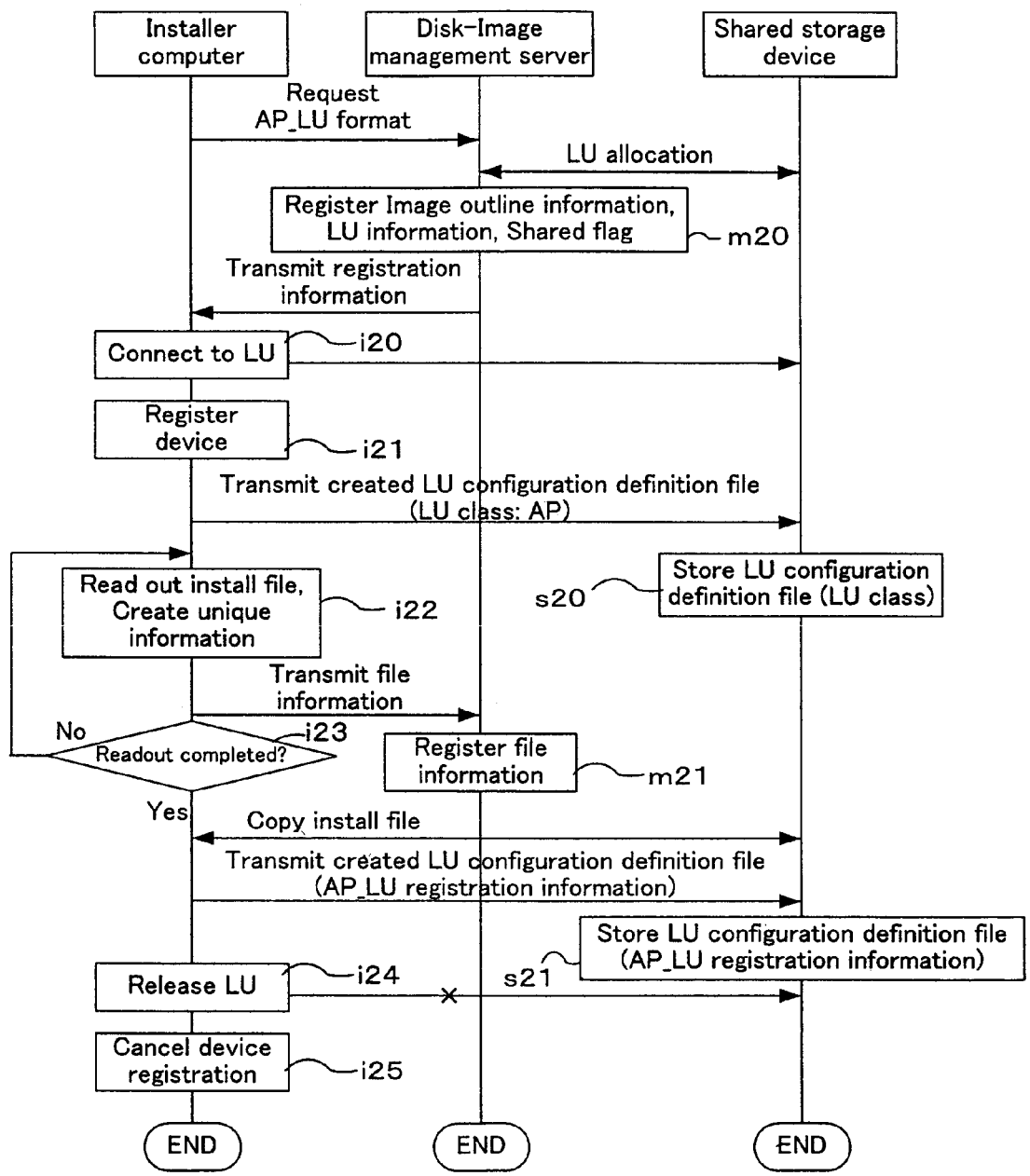
FIG. 11 is a flowchart of a processing routine for formatting a new application information storage area in a storage device.
Figure 12:
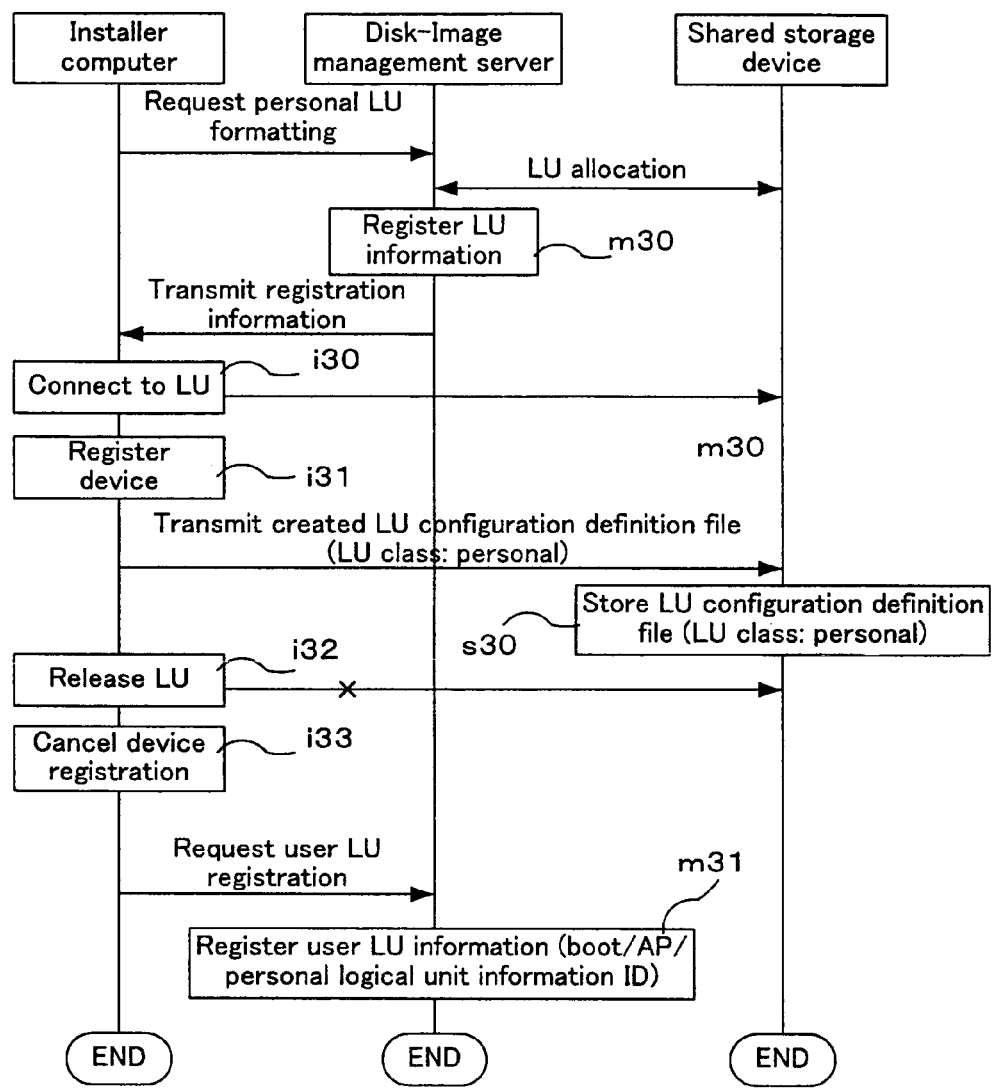
FIG. 12 is a flowchart of a processing routine for formatting a new personal storage area in a storage device.

The following description of a procedure for formatting new information storage areas, i.e. logical units, in storage devices 50a, 50b makes reference to FIG. 10–FIG. 12. FIG. 10 is a flowchart of a processing routine for formatting a new boot information storage area in a storage device. FIG. 11 is a flowchart of a processing routine for formatting a new application information storage area in a storage device.

FIG. 12 is a flowchart of a processing routine for formatting a new personal storage area in a storage device.

The following example describes an instance in which the installer program is executed by the installer computer 40; however, the installer program could of course be executed by a computer 10 instead. That is, an installer program 124 like that shown in FIG. 2 could be stored in memory 12 of computer 10, the installer program 124 comprising a storage area identifying information acquisition module, write request module, allocation determination module, allocation request module, information determination modules, and information storage request modules. In this case, a storage area identifying information acquisition module, write request module, allocation determination module, allocation request module, boot information determination module, application information determination module, personal storage area creation request module, personal information storage request module, boot information storage area creation request module, application information storage area creation request module, boot information storage request module, and application information storage request module are realized by means of CPU 11 executing the installer program 124.

The following description of a process for formatting a new boot information storage area makes reference to FIG. 10. The installer computer 40, using the IP address allocated to the disk-image management server 30 pre-stored in storage device 41, requests the disk-image management server 30 to transmit the contents of the boot information it is desired to format, as well as to format(allocate) a boot logical unit (boot LU). The disk-image management server 30 requests the controller 51a, 51b of storage device 50a, 50b for allocation of a logical unit, and acquires the information of the allocated logical unit. The disk-image management server 30 registers the boot information sent from the installer computer 40 in the image outline information in the boot logical unit information, and registers the logical unit information acquired from the storage device 50a, 50b in the Boot-LU information in the boot logical unit information (Step m10). The disk-image management server 30 then sends the registered boot logical unit information to the installer computer 40.

The installer computer 40, using the Boot-LU information included in the boot logical unit information sent from the disk-image management server 30, connects to the allocated logical unit of the storage device 50a, 50b (Step i10). Specifically, using the device name, logical unit name, and IP address, it connects to the allocated boot logical unit. The installer computer 40 also performs device registration of the allocated boot logical unit (step i11). By means of this procedure, the installer computer 40 can utilize the allocated boot logical unit as a network drive.

The installer computer 40 creates a file that defines the configuration of the LU being used (here, the boot LU) (boot LU configuration definition file). The installer computer 40 sends the LU configuration definition file so created to the storage device 50a, 50b. The storage device 50a, 50b receiving the LU configuration definition file stores the LU configuration definition file in the corresponding LU (Step s10).

The installer computer 40 reads out from the storage device 41 the file for creating the boot information that is to be installed, and creates for the read out file the unique information described earlier, and file information (Step i12). In the embodiment, the installation procedure, i.e. the procedure for migrating information to storage device 50*a*, 50*b*, is carried out in file units, rather than in volume units or block units.

The installer computer 40 sends the created file information to the disk-image management server 30. The disk-image management server 30 registers the file information sent from the installer computer 40 in the boot logical unit information (Step m11). The installer computer 40 executes Step i12 repeatedly until reading of all installation files has been completed (Step i13: No), and when reading has been completed (Step i13: Yes) executes copying of the read installation files to the allocated boot logical unit.

The installer computer 40 then requests the storage device 50*a*, 50*b* to release the allocated boot logical unit (Step i14) and cancels device registration (Step i15). By means of the above process, the process of formatting a new boot information storage area and migrating boot information to storage devices 50*a*, 50*b* by the installer computer 40 is completed.

The following description of a process for formatting a new application information storage area makes reference to FIG. 11. The installer computer 40, using the IP address allocated to the disk-image management server 30 pre-stored in storage device 41, requests the disk-image management server 30 to transmit the contents of the application information it is desired to create, as well as to format (allocate) an AP logical unit (AP_LU). The disk-image management server 30 requests the controller 51*a*, 51*b* of storage device 50*a*, 50*b* for allocation of a logical unit, and acquires the information of the allocated logical unit. The disk-image management server 30, on the basis of the application information sent from the installer computer 40, registers in the image outline information and a shared use flag in the application logical unit information, and registers logical unit information acquired from storage devices 50*a*, 50*b* in the AP_LU information in the application logical unit information (Step m20). The disk-image management server 30 then sends the registered application logical unit information to the installer computer 40.

Here, the application information sent from the installer computer 40 includes application name, version, and information indicating whether for shared use. Where shared use of a newly formatted AP_LU by a plurality of computers 10 is allowed, the shared use flag in the application logical unit information is set to ON, whereas in the event that shared use is not allowed, the shared use flag is set to OFF.

The installer computer 40, using the AP_LU information included in the application logical unit information sent from the disk-image management server 30, connects to the allocated logical unit of the storage devices 50*a*, 50*b* (Step i20). Specifically, using the device name, logical unit name, and IP address, it connects to the allocated AP logical unit. The installer computer 40 also performs device registration of the allocated AP logical unit (step i21). By means of this procedure, the installer computer 40 can utilize the allocated AP logical unit as a network drive.

The installer computer 40 creates a file that defines the configuration of the LU being used (here, the AP_LU) (AP_LU configuration definition file). The installer computer 40 sends the LU configuration definition file so created to the storage device 50*a*, 50*b*. Storage devices 50*a*, 50*b* receiving the LU configuration definition file stores the LU configuration definition file in the corresponding LU (Step s20).

The installer computer 40 reads out from the storage device 41 the file for creating the application information that is to be installed, and creates for the read out file the unique information described earlier, and file information (Step i22). In the embodiment, the installation procedure, i.e. the procedure for migrating information to a storage device 50*a*, 50*b*, is carried out in file units, rather than in volume units or block units.

The installer computer 40 sends the created file information to the disk-image management server 30. The disk-image management server 30 registers the file information sent from the installer computer 40 in the application logical unit information (Step m21). The installer computer 40 executes Step i22 repeatedly until reading of all installation files has been completed (Step i23: No), and when reading has been completed (Step i23: Yes) executes copying of the read installation files to the allocated AP logical unit.

The installer computer 40 then creates a link to a directory of boot information to be associated with the installed application information type, version, etc. and with the installed application information, and creates an LU configuration definition file (AP_LU registration information). The installer computer 40 then sends the created LU configuration definition file to storage devices 50*a*, 50*b*. Storage devices 50*a*, 50*b* receiving the LU configuration definition file store it in the corresponding LU (Step s21).

The installer computer 40 then requests the storage device 50*a*, 50*b* to release the allocated AP logical unit (Step i24) and cancels device registration (Step i25). By means of the above process, the process of formatting a new application information storage area and migrating application information to storage devices 50*a*, 50*b* by the installer computer 40 is completed.

The following description of a process for formatting a new personal storage area makes reference to FIG. 12. The installer computer 40, using the IP address allocated to the disk-image management server 30 pre-stored in storage device 41, requests the disk-image management server 30 to format the personal logical unit (boot LU). The disk-image management server 30 requests the controller 51*a*, 51*b* of storage device 50*a*, 50*b* for allocation of the personal logical unit, and acquires the information of the allocated logical unit. The disk-image management server 30 registers logical unit information acquired from storage devices 50*a*, 50*b* in the Personal-LU information in the personal logical unit information (Step m30). The disk-image management server 30 then sends the registered personal logical unit information to the installer computer 40.

The installer computer 40, using the Personal-LU information included in the personal logical unit information sent from the disk-image management server 30, connects to the allocated logical unit of the storage devices 50*a*, 50*b* (Step i30). Specifically, using the device name, logical unit name, and IP address, it connects to the allocated personal logical unit. The installer computer 40 also performs device registration of the individual AP logical unit (step i31). By means of this procedure, the installer computer 40 can utilize the allocated personal logical unit as a network drive.

The installer computer 40 creates a file that defines the configuration of the LU being used (here, the personal LU) (personal LU configuration definition file). The installer computer 40 sends the LU configuration definition file so created to the storage device 50*a*, 50*b*. Storage devices 50*a*, 50*b* receiving the LU configuration definition file stores the LU configuration definition file in the corresponding LU (Step s30).

During new installation of boot information and application information, only shared information exists, with there being no personal information characteristic of the operating environment of the computer 10, and thus installation of personal information on the storage device 50*a*, 50*b* is not carried out.

The installer computer 40 then requests the storage device 50*a*, 50*b* to release the allocated AP logical unit (Step i32) and cancels device registration (Step i33). In order to associate computers 10 with newly installed boot information, application information and personal information, the installer computer 40 requests the disk-image management server 30 to register the user logical unit information. Specifically, the installer computer 40 sends to the disk-image management server 30 a request for registration of user logical unit information, together with identifying information (the address) of the computer 10 that is to be associated with the information just installed. In response to the request of the installer computer 40, the disk-image management server 30 executes registration of the user logical unit information (Step m31). Where the installer program is executed by the installer computer 40, registration of user logical unit information may be executed afterward. On the other hand, where computers 10 function as the installer computer 40, that is, where the installer program is executed on computers 10, it will preferably carried out together with registration of information on the storage devices 50*a*, 50*b*. By means of the above process, creation of personal storage areas on storage devices 50*a*, 50*b* by the installer computer 40 is completed, and information storage areas for storing new boot information, application information, and personal information are created on storage devices 50*a*, 50*b*.

Figure 13:
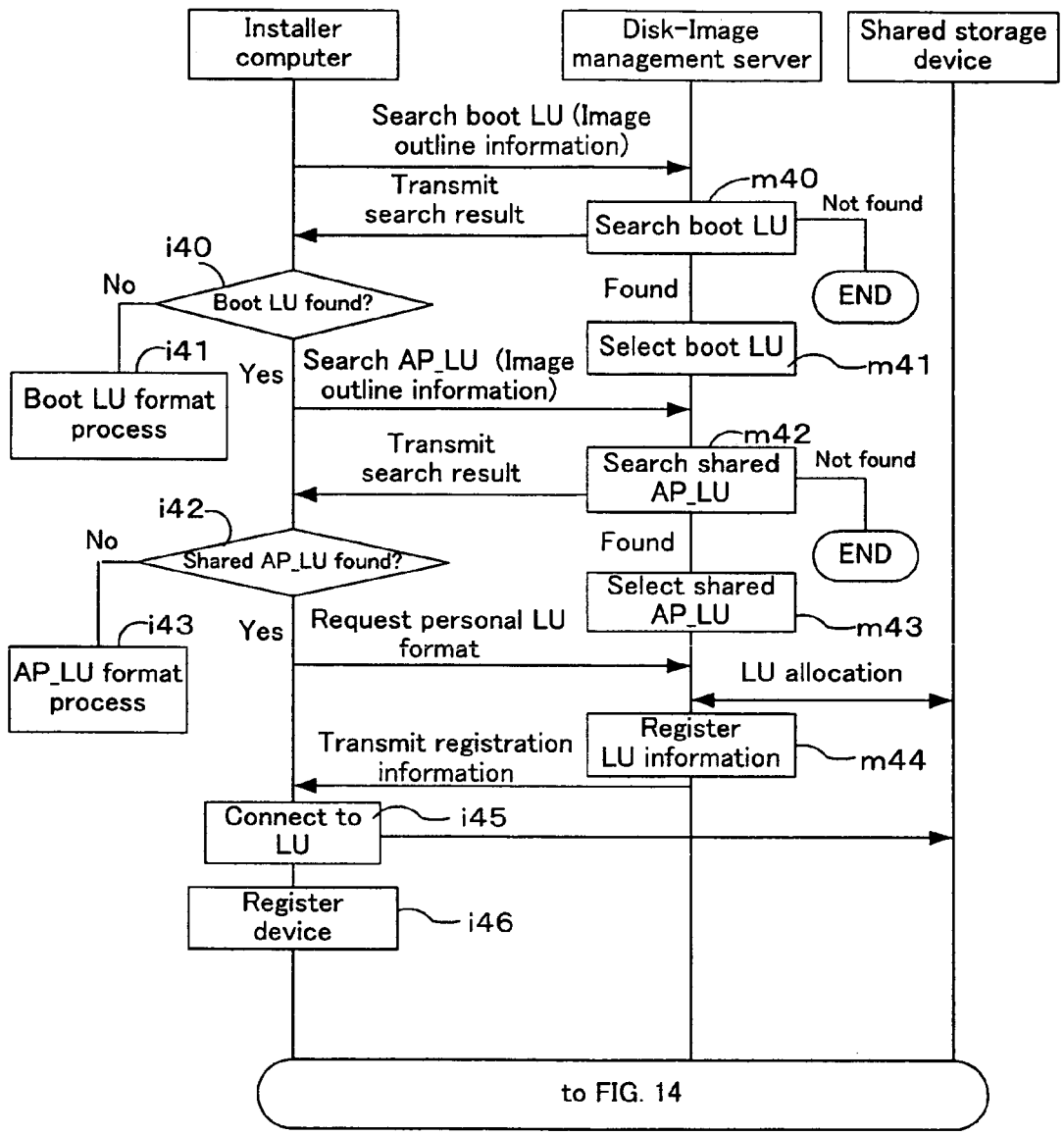
FIG. 13 is a flowchart of a processing routine for migrating information stored on local disks of computers to a storage device.
Figure 14:
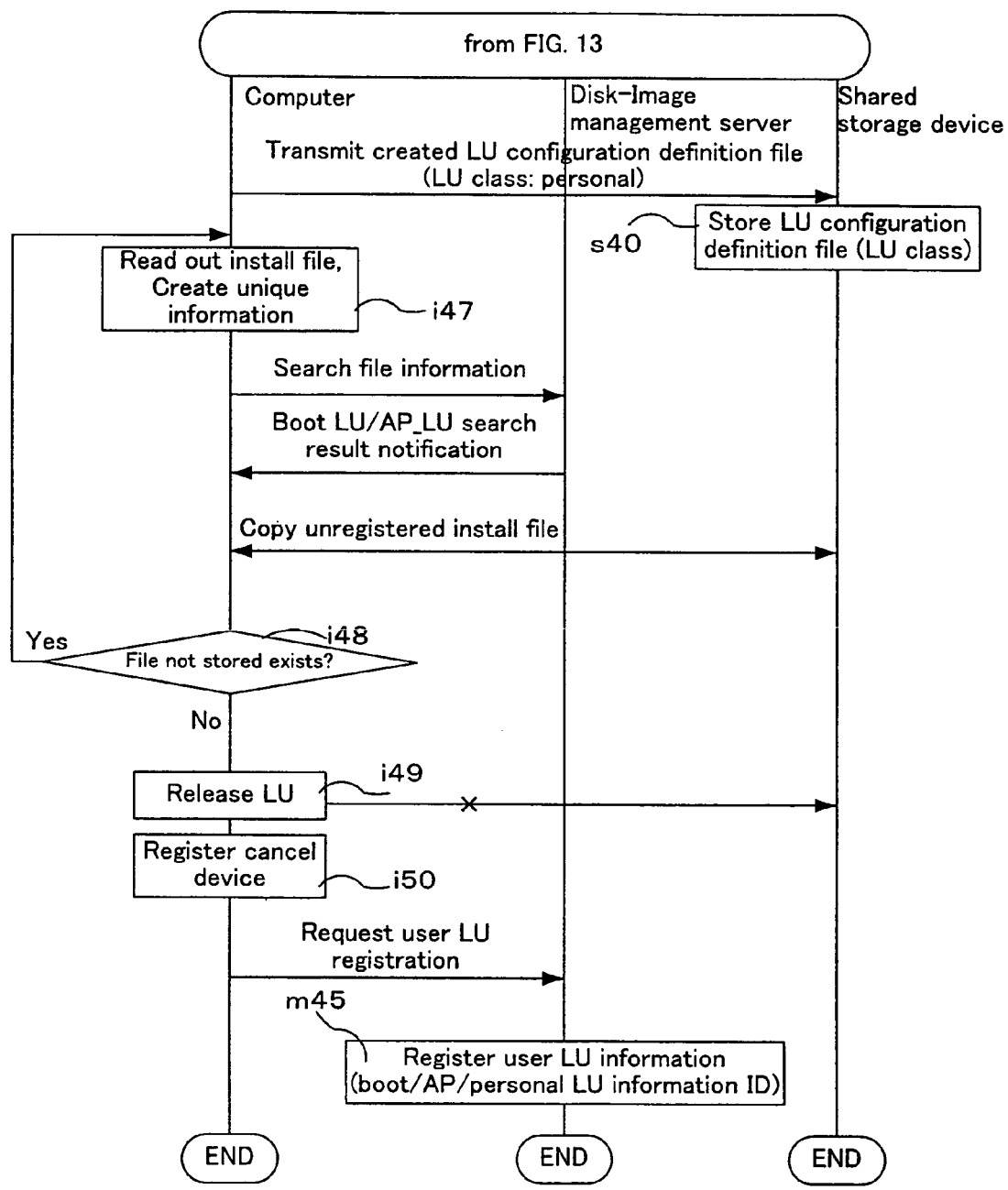
FIG. 14 is a flowchart of a processing routine for migrating information stored on local disks of computers to a storage device.

The following description of a process for migrating information stored on local disks of computers 10 to the storage devices 50*a*, 50*b* makes reference to FIG. 13 and FIG. 14. FIG. 13 and FIG. 14 show a flowchart of a processing routine for migrating information stored on local disks of computers to a storage device. While the description hereinbelow takes by way of example an instance in which the installer program is run on computer 10, the installer computer 40 described earlier could be used instead. In this case, information stored on local disks of computers 10 is initially stored in storage device 41 by the installer computer 40, which then initiates the process for migrating the information to the storage devices 50*a*, 50*b*.

Computer 10 (CPU 11), using the IP address allocated to itself (pre-stored in memory 12) and the IP address allocated to disk-image management server 30, or by acquiring from the DHCP/TFTP server 20 the IP address for itself and the IP address of the disk-image management server 30, executes a process for migrating, via the IP network 60, information which is stored on the local disks.

To disk-image management server 30 computer 10 issues a request to add information for itself to the user logical unit information table. In the event that information identifying the computer 10 which has issued the request to the user logical unit information is not currently registered, the disk-image management server 30 establishes new user logical unit information for the computer 10. In this case, the new user logical unit information registered in association with computer 10 registers only computer identifying information, with boot LU_ID and the like still not registered at this point. This information is subsequent registered as-needed during migrating of data, described hereinbelow. Computer 10 requests the disk-image management server 30 to search whether there exists on storage devices 50*a*, 50*b* a boot LU for storing boot information stored on the local disk. That is, computer 10 queries whether image outline information identical to the image outline information of boot information stored on the local disk of computer 10 is currently registered in the boot logical unit information.

Using the image outline information of boot information sent from computer 10, the disk-image management server 30 searches the storage device 31 (Step m40), and in the event that the requested boot LU cannot be found, sends to computer 10 a search result to the effect that the requested boot LU could not be found, and then terminates the routine.

In the event that the requested boot LU is found, the disk-image management server 30 sends to computer 10 a search result to the effect that the requested boot LU was found, and selects the found boot LU (Step m41). The disk-image management server 30 having selected the boot LU registers the LU information of the boot LU in the user logical unit information corresponding to the computer 10.

In the event that the content of the search result sent from the disk-image management server 30 is that the requested boot LU could not be found, computer 10 executes the boot LU creation process (boot logical unit creation process) described previously (Step i41).

In the event that the content of the search result sent from the disk-image management server 30 is that the requested boot LU was found, computer 10 now requests the disk-image management server 30 to search for a shared AP-LU, for the purpose of migrating AP information to storage devices 50*a*, 50*b*. That is, computer 10 queries whether image outline information identical to the image outline information of AP information stored on the local disk of computer 10 is currently registered in the application logical unit information, with the shared use flag being ON.

Using the image outline information of AP information sent from computer 10, the disk-image management server 30 searches the storage device 31 (Step m42), and in the event that the requested shared AP_LU cannot be found, sends to computer 10 a search result to the effect that the requested shared AP_LU could not be found, and then terminates the routine.

In the event that the requested shared AP_LU is found, the disk-image management server 30 sends to computer 10 a search result to the effect that the requested shared AP_LU was found, and selects the found shared AP_LU (Step m43). The disk-image management server 30 having selected the shared AP_LU registers the shared AP_LU information in the user logical unit information corresponding to the computer 10.

In the event that the content of the search result sent from the disk-image management server 30 is that the requested shared AP_LU could not be found (Step i42: No), computer 10 executes the AP_LU creation process (application logical unit creation process) described previously (Step i43). That is, since there does not exist in storage devices 50*a*, 50*b* an AP_LU that allows for shared use by the plurality of computers 10, an AP_LU having duplicative stored content is created for the same given application information. Or, since there does not exist in storage devices 50*a*, 50*b* an AP_LU for storing the requested application information, a new AP_LU is formatted.

In the event that the content of the search result sent from the disk-image management server 30 is that the requested AP_LU was found(Step i42: Yes), computer 10 now requests the disk-image management server 30 to format a personal logical unit for the purpose of migrating personal information to storage devices 50*a*, 50*b*. That is, whereas boot information and AP information are typically shared information shared by a plurality of computers 10, personal information is information that is not shared by a plurality of computers 10, and thus needs to be installed anew on each computer executing the installer program.

The disk-image management server 30 requests the controller 51a, 51b of storage device 50a, 50b to allocate a logical unit LU, and registers the content of the allocated logical unit as Personal-LU information in the personal logical unit information (Step m44). The disk-image management server 30 then sends the registered personal logical unit information (Personal-LU information) to the computer 10.

The computer 10, using the Personal-LU information included in the personal logical unit information sent from the disk-image management server 30, connects to the allocated logical unit of the storage device 50a, 50b (Step i45). Specifically, using the device name, logical unit name, and IP address, it connects to the allocated personal logical unit. The computer 10 also performs device registration of the allocated personal logical unit (step i46). By means of this procedure, the computer 10 can utilize the allocated personal logical unit as a network drive.

The computer 10 creates a file that defines the configuration of the allocated personal LU (personal LU configuration definition file). The installer computer 40 sends the LU configuration definition file so created to the storage device 50a, 50b. The storage device 50a, 50b receiving the LU configuration definition file stores the LU configuration definition file in the corresponding LU (Step s40).

The computer 10 reads out from the local disk the files for creating the boot information and application information to be installed, creates for the read out file the unique information described earlier, and creates file information (Step i47). Computer 10 transmits the created file information to the disk-image management server 30, and requests a search for the transmitted file information. Using the file information transmitted from the computer 10, the disk-image management server 30 searches for File information for Boot-LU information and file information for AP_LU information, and notifies the computer 10 of the search results. Specifically, unique information allocated to each file contained in the file information transmitted from computer 10 is compared with file information included in the Boot-LU information and AP_LU information present on the disk-image management server 30, and if there is no matching file, it is decided that a file that is currently not stored exists. The files will typically include files relating to, for example, user-specific data, drivers, or desktop display. The disk-image management server 30 notifies the computer 10 that the transmitted file information, i.e. files, are either registered in the boot LU and AP_LU of storage devices 50a, 50b, or not yet registered therein. For files constituting personal information, if present these will necessarily be files that are currently not stored, and will be copied to the personal LU (personal storage area) of storage devices 50a, 50b.

Computer 10 copies the files included in the search result to the personal LU of storage devices 50a, 50b. As shared information, the boot information and AP information files copied to the boot LU and AP_LU are basic files unaffected by the operating environment of the computer 10; other files affected by the operating environment, for example, driver files, are stored in the personal LU. Step i47 is executed repeatedly until files not stored are no longer detected (Step i48: Yes), and once copying of all files not stored has been completed (Step i48: No), the storage devices 50a, 50b are requested to release the allocated personal logical unit (Step i49). The computer 10 cancels device registration (Step i50), and requests the disk-image management server 30 to perform registration in the user logical unit information, for the newly copied personal information.

The disk-image management server 30 registers the ID of the newly moved personal information in the user logical unit information (Step m45). By means of the above process, migrating of information stored on the local disk of the computer 10 to the storage devices 50a, 50b is completed.

Figure 15:
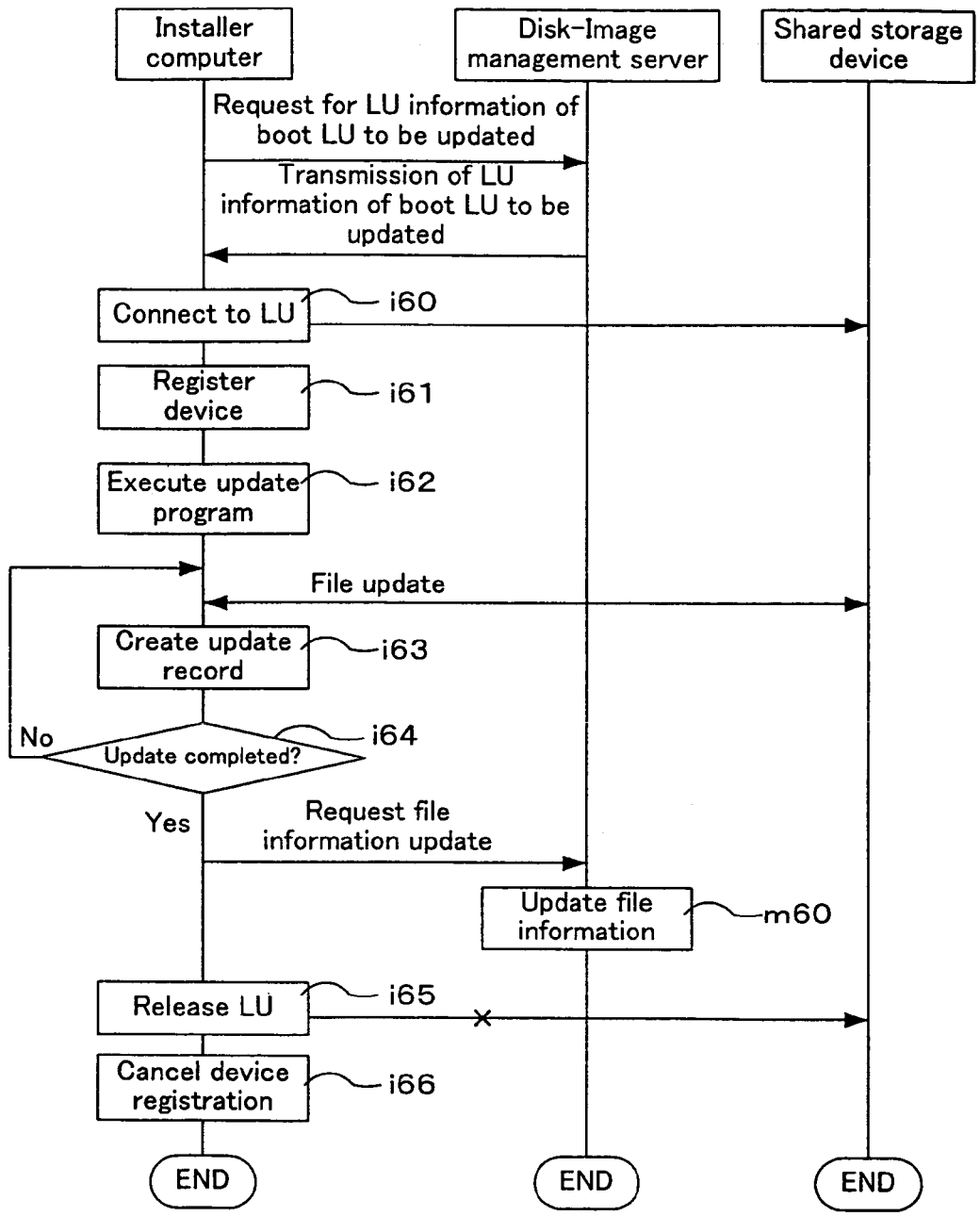
FIG. 15 is a flowchart of a processing routine for executing a boot information update process in the embodiment.
Figure 16:
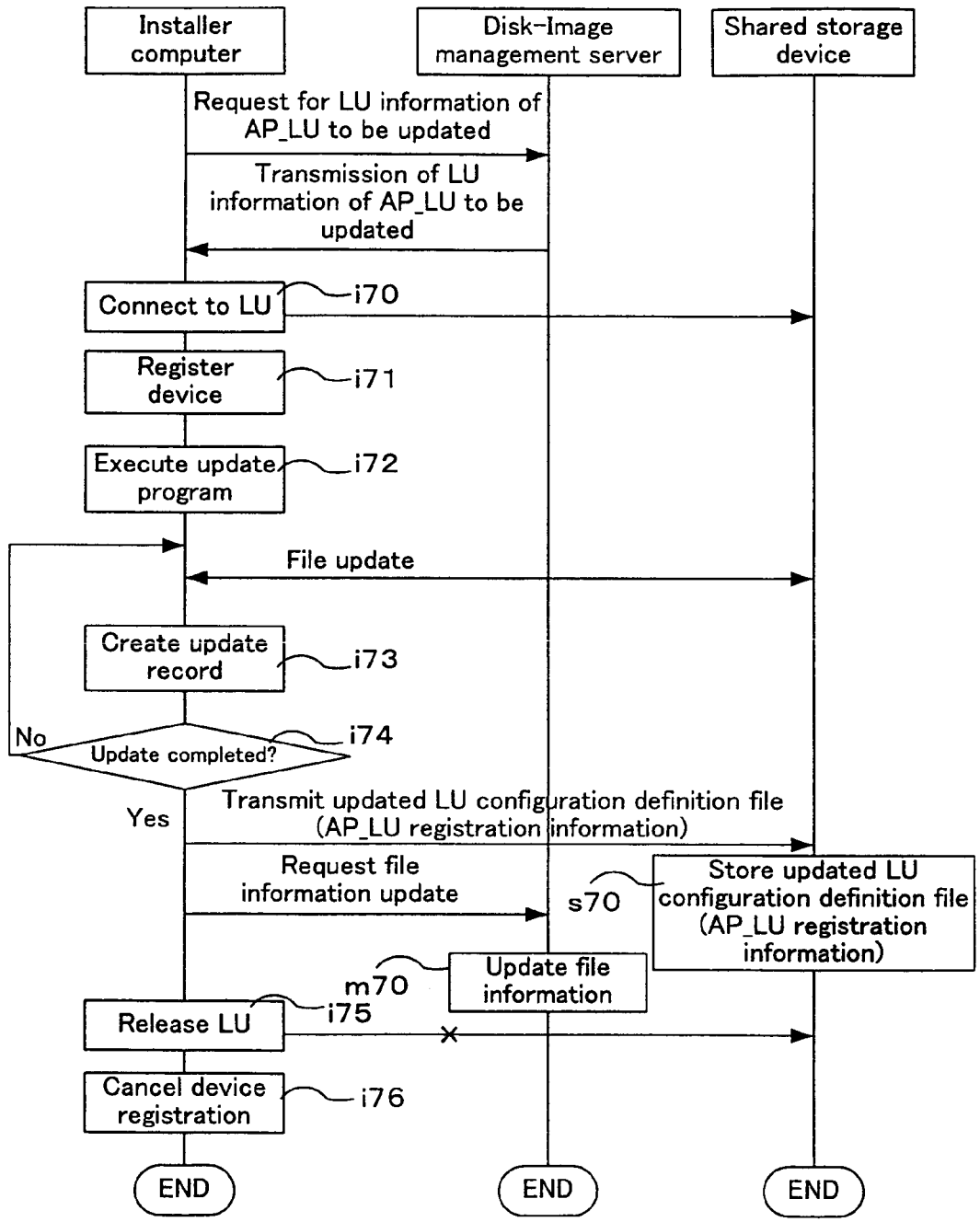
FIG. 16 is a flowchart of a processing routine for executing an application information update process in the embodiment.

The following description of an update process of a shared information stored in storage devices 50a, 50b makes reference to FIG. 15 and FIG. 16. FIG. 15 is a flowchart of a processing routine for executing a boot information update process in the embodiment. FIG. 16 is a flowchart of a processing routine for executing an application information update process in the embodiment.

The following description of an update process of boot information makes reference to FIG. 15. Using the IP address allocated to the disk-image management server 30, the installer computer 40 requests the disk-image management server 30 for Boot-LU information which is LU information for a boot LU that is to be updated. The disk-image management server 30 then sends to the installer computer 40 the requested Boot-LU information for the boot LU to be updated.

Using the Boot-LU information contained in the boot logical unit information that was sent from the disk-image management server 30, the installer computer 40 connects to the allocated logical unit of the storage device 50a, 50b (Step i60). The installer computer 40 then performs device registration of the allocated boot logical unit (Step i61). By means of this process, the installer computer 40 can utilize the allocated boot logical unit as a network drive.

The installer computer 40 executes the update program (Step i62), and copies to the storage devices 50a, 50b the update information stored in storage device 41 or on a storage medium such as a CD-ROM or DVD-ROM. Using the update information sent from the installer computer 40, the controller 51a, 51b of the storage device 50a, 50b overwrites the existing file targeted for update with the update file, or deletes the existing file, to execute the update process.

The installer computer 40 creates an update record for files sent to storage devices 50a, 50b (Step i63). Specifically, the file name of the overwritten file or the file name of the deleted file is recorded. The installer computer 40 executes file updates and creation of update records until the update process is complete (Step i64: No); once the update process is complete (Step i64: Yes), it requests the disk-image management server 30 to update the file information. At this time, the installer computer 40 requests to update file information, as well as updating unique information of the overwritten file (as a new unique integer) and sending it to the disk-image management server 30.

Using the updated unique information sent from the installer computer 40, the disk-image management server 30 updates the unique information of the overwritten file, or deletes the file name and unique information corresponding to the deleted file (Step m60).

The installer computer 40 requests the storage devices 50a, 50b to release the allocated boot logical unit (Step i65), and cancels device registration (Step i66). By means of the above process, the process of updating boot information in storage devices 50a, 50b is completed.

The following description of an update process of application information makes reference to FIG. 16. Using the IP address allocated to the disk-image management server 30, the installer computer 40 requests the disk-image management server 30 for AP_LU information which is LU information for an AP_LU that is to be updated. The disk-image management server 30 then sends to the installer computer 40 the requested AP_LU information for the AP_LU to be updated.

Using the AP_LU information contained in the application logical unit information that was sent from the disk-image management server 30, the installer computer 40 connects to the allocated logical unit of the storage device 50a, 50b (Step i70). The installer computer 40 then performs device registration of the allocated AP logical unit (Step i71). By means of this process, the installer computer 40 can utilize the allocated AP logical unit as a network drive.

The installer computer 40 executes the update program (Step i72), and copies to the storage devices 50a, 50b the update information stored in storage device 41 or on a storage medium such as a CD-ROM or DVD-ROM. Using the update information sent from the installer computer 40, the controller 51a, 51b of the storage device 50a, 50b overwrites the existing file targeted for update with the update file, or deletes the existing file, to execute the update process.

The installer computer 40 creates an update record for files sent to storage devices 50a, 50b (Step i73). Specifically, the file name of the overwritten file or the file name of the deleted file is recorded. The installer computer 40 executes file updates and creation of update records until the update process is complete (Step i74: No); once the update process is complete (Step i74: Yes), it updates the file defining the updated LU configuration (here, the AP_LU registration information). The installer computer 40 then sends the updated LU configuration definition file to the storage devices 50a, 50b. The storage devices 50a, 50b receiving the updated LU configuration definition file store the LU configuration definition file in the corresponding LU (Step s70).

In response to a request, controller 51a, 51b updates the LU configuration definition file (Step s70). Specifically, registered contents, such as the version of the updated application program and the like, are updated.

The installer computer 40 requests the disk-image management server 30 to update the file information. At this time, the installer computer 40 requests update of file information, as well as updating the unique information of the overwritten file (as a new unique integer) and sending it to the disk-image management server 30.

Using the updated unique information sent from the installer computer 40, the disk-image management server 30 updates the unique information of the overwritten file, or deletes the file name and unique information corresponding to the deleted file (Step m70).

The installer computer 40 requests the storage devices 50a, 50b to release the allocated AP logical unit (Step i75), and cancels device registration (Step i76). By means of the above process, the process of updating AP information in storage devices 50a, 50b is completed.

Figure 17:
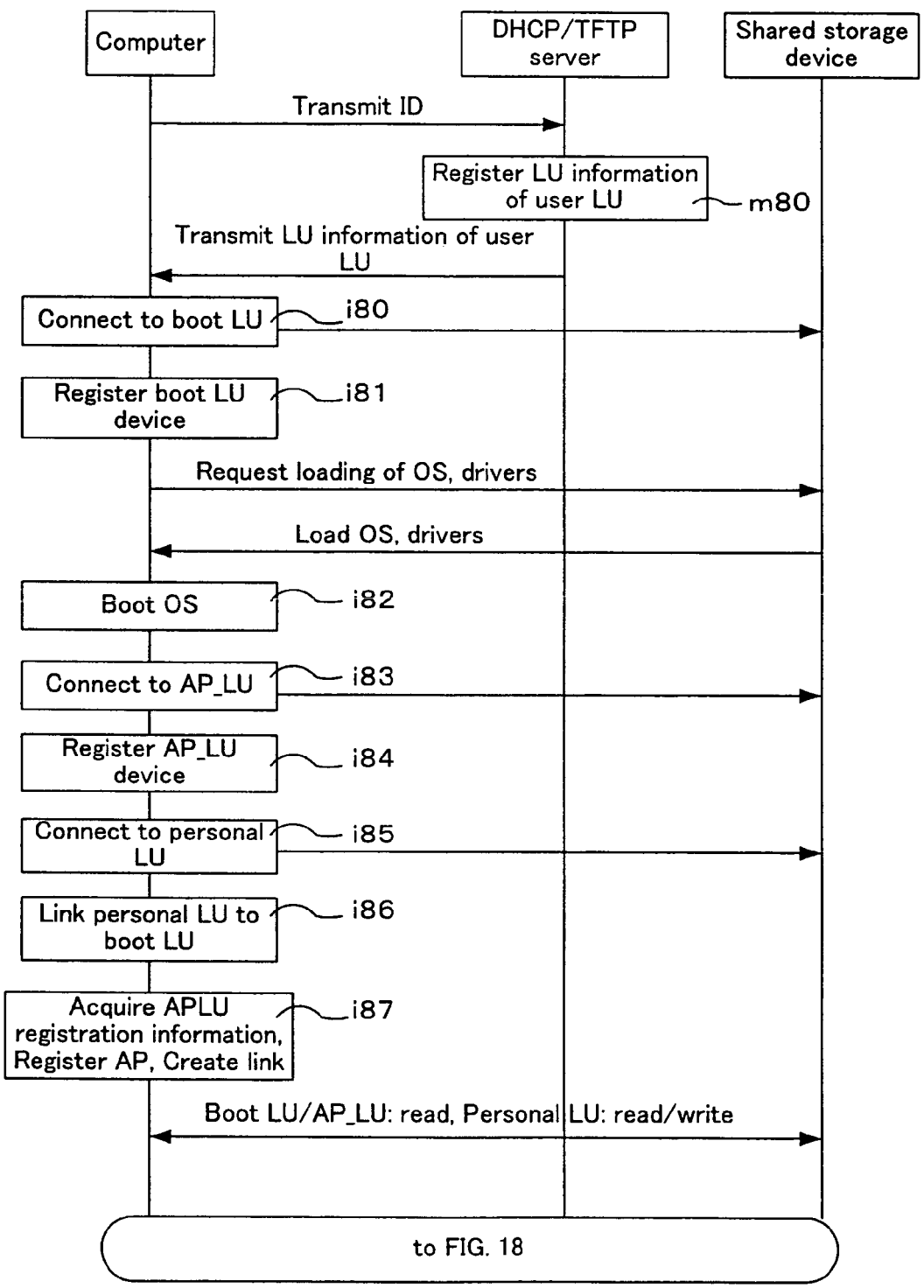
FIG. 17 is a flowchart of a processing routine for executing a network boot of a computer in the computer system pertaining to the embodiment.
Figure 18:
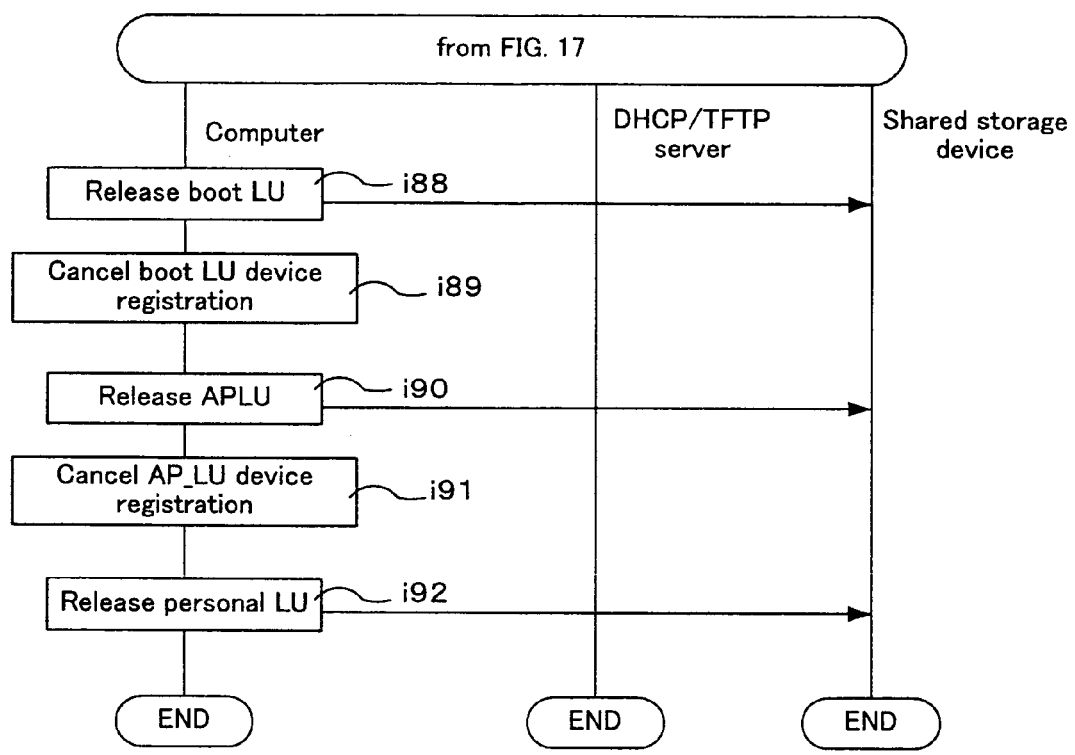
FIG. 18 is a flowchart of a processing routine for executing a network boot of a computer in the computer system pertaining to the embodiment.

The following description of a boot process for performing a network boot of a computer 10 makes reference to FIG. 17 and FIG. 18. FIG. 17 and FIG. 18 are flowcharts of a processing routine for executing a network boot of a computer in the computer system pertaining to the embodiment.

When computer 10 is powered on, the BIOS 125 reads the PXE (Preboot eXecution Environment) program 126 from ROM (memory 12), and runs it. The PXE program contains, for example, an identifying information acquisition module for acquiring information that identifies information, i.e. user logical unit information, from the disk-image management server 30; an information acquisition module for acquiring boot, AP and personal information from boot, AP and personal logical units; a boot module for running an operating system or application program using the acquired boot information or AP information; and a read/write request module for requesting controller 51, 51b of storage device 50a, 50b to read or write. These modules are realized by means of CPU 11 executing the PXE program.

By means of execution of the PXE program, computer 10 transmits the ID of computer 10 to the DHCP/TFTP server 20, and requests allocation of an IP address to be used by the computer 10, and transmission of the IP address of the DHCP/TFTP server 20, the boot program name, the IP address of the network router 55, and boot and AP_LU information in the user logical units. That is, computer 10 requests transmission of logical unit LU information having stored therein boot information consisting of the boot image to be used, and application information consisting of the image to be used.

The DHCP/TFTP server 20 requests the disk-image management server 30 to transmit the user logical unit information (boot and AP-LU information) corresponding to the requesting computer 10. This request includes ID information corresponding to the requesting computer 10. The disk-image management server 30 then sends the user logical unit information corresponding to the transmitted ID to the DHCP/TFTP server 20. Having received this information from the disk-image management server 30, the DHCP/TFTP server 20 registers this information in itself (Step m80), and sends the received boot and AP_LU information to the requesting computer 10.

Using the Boot-LU information, the computer 10 connects to the allocated boot logical unit (Step i80) and registers as a drive (Step i81). By means of this process, computer 10 can use the allocated boot logical unit in the storage device 50a, 50b as drive for boot up, in the same manner as its local disk drive.

Computer 10 requests storage device 50a, 50b to load boot information including an operating system (OS) and drivers. Controller 51a, 51b receiving the request from computer reads out boot information from the relevant boot LU and sends it to the computer 10. Computer 10 boots the loaded OS and installs the drivers (Step i82). By means of this process, computer 10 assumes a booted state, and with installation of appropriate drivers will be able to exchange data with printers and other peripherals.

When any application is run, computer 10 connects to the AP_LU storing the requested application (Step i83) and performs device registration of the AP_LU (Step i84). The computer 10 then connects to the corresponding personal LU performs device registration of the individual_LU (Step i85). As a result, the computer 10 is able to use storage devices 50a, 50b like a local disk drive.

Computer 10 then links the device-registered personal LU to a boot LU (Step i86). Specifically, computer 10 accomplishes this by requesting controller 51a, 51b to record to a disk configuration definition file. As a result, read/write operations with respect to the personal LU in association with execution of the operating system by controllers 51a, 51b are executed on an personal LU linked with a particular operating system.

Computer 10 acquires AP_LU registration information from storage devices 50a, 50b, and registers the application program, as well as linking the AP_LU to the boot LU in accordance with the link directory name, to associate the LUs with one another (Step i87). Since an application program operates in conjunction with an operating system it is necessary to associate application programs on a program-by-program basis with an operating system. By means of the LU association process, it is possible to handle different LUs as a single LU, i.e. in the same manner as a local disk. This LU association process is executed by means of a device management module. The device management module may be provided with disk-image management server 30 and storage devices 50a, 50b (controllers 51a, 51b) instead of computer 10.

Computer 10 is only able to read from the boot LU and AP_LU, but can both read from and write to personal LU s. Under such conditions, various files needed in various processes using an OS or application program are read from the boot LU, AP_LU or personal LU; and information created by various processes is written to personal LU s.

When the computer 10 is shut down, the controllers 51a, 51b are requested to release the boot LU of the computer 10 (Step i88), and device registration of the boot LU is canceled (Step i89). Next, the computer 10 requests the controllers 51a, 51b to release the AP_LU (Step i90), and device registration of the AP_LU is canceled (Step i91). Finally, the computer 10 requests the controllers 51a, 51b to release the personal LU (Step i92), and shutdown of the computer 10 is completed.

As described hereinabove, according to the computer system 100 of the embodiment, boot information, AP information and personal information stored on the local disks of a plurality of computers can be stored on storage devices 50a, 50b. That is, where shared information, namely boot information and AP information, stored on each computer 10 is already stored in a boot LU or AP_LU of a storage device 50a, 50b, a new boot LU or AP_LU is not formatted for the boot information and AP information, with only differential data being stored in the personal LU. More specifically, for an already registered file, copying to a boot LU or AP_LU is not executed; only files that are currently not stored making up shared information are stored in an personal LU. Accordingly, it becomes possible to hold down the memory capacity required of storage devices, as well as to reduce the amount of time needed to move information stored on the local disk of a computer 10 to a storage device 50a, 50b.

According to the computer system 100 of the embodiment, information stored on the local disk of a computer 10 can be readily stored without duplication in a storage device 50a, 50b. Specifically, in the embodiment, unique information is allocated to each file making up the boot information and AP information stored in the boot LU and AP_LU. Unique information is also allocated to each file making up the boot information and AP information stored on the local disk of a new computer 10. Accordingly, by comparing the two, a file not stored can readily be determined.

According to the computer system 100 of the embodiment, by means of updating boot information and AP information stored in storage devices 50a, 50b, the operating system and application programs used in computers 10 can be updated. That is, the operating system and application programs used in computers 10 can be updated by means of, for example, the administrator executing an update process on storage devices 50a, 50b, rather than having to individually update boot information and AP information stored on the local disk of each computer 10.

According to the computer system 100 of the embodiment, files for copying by way of shared information to the boot LU and AP_LU are basic files of boot information and AP information which are unaffected by the operating environment of computer 10; other files which are affected by the operating environment of computer 10, for example, driver files, are stored in an personal LU. Accordingly, shared information can be held without modification by operating environment on the one hand, while associating the personal LU, AP_LU and boot LU so that it becomes possible to execute an operating system and application programs that reflect the operating environment.

According to the computer system 100 of the embodiment, since access frequency to a given logical unit in a storage device 50a, 50b is high, cache hit rate can be improved, and accessibility to the logical unit can be improved.

According to the computer system 100 of the embodiment, when migrating boot information, AP information and personal information to a storage device 50a, 50b, this is carried out in file units, so that information can be moved without a match between the capacity of the computer 10 local disk and the capacity of a logical unit of a storage device 50a, 50b. That is, when information is moved in image units, since it is not possible to divide up an image, it is necessary to precisely adjust memory capacity of the source and destination. In contrast, with the computer system 100 of the embodiment, in the event that the capacity of a single logical unit is exceeded, the rest of the file can simply be stored in another logical unit.

Other Examples (1) In the embodiment hereinabove, a new boot information storage area and application information storage area for the storage devices 50a, 50b are formatted by the installer computer 40, but could instead by formatted by computer 10. For example, where the computer system 100 pertaining to the embodiment is made up of a plurality of existing computers (having local disks) 10, the new boot information storage area and application information storage area are formatted by the computer 10 which initially executes the installer program. In this case, information stored only the local disk of an existing computer 10 only can be moved to storage devices 50a, 50b.

(2) In the embodiment hereinabove, the process for migrating information stored on local disks of computers 10 to storage devices 50a, 50b is executed by computers 10, but could instead by executed by the installer computer 40. In this case, an administrator would be able to perform the migrating process all at one.

(3) In the embodiment hereinabove, there was described an example wherein computers 10 have local disks; however, the use of so-called diskless computers is of course possible as well. Where diskless computers are used, no process for migrating information stored on local disks will be carried out; however, a diskless computer can be network (4) booted by means of having the installer computer 40 store boot information and AP information on storage devices 50a, 50b. For diskless computers making up an already configured computer system, by handling storage devices functioning as storage disks on the network of diskless computers as local disks, it is possible to carry out the information migrating process in the embodiment hereinabove. In this case, the storage devices in the existing computer system can be replaced with the storage devices 50a, 50b in the embodiment.

(4) In the embodiment hereinabove, the disk-image management server 30 and installer computer 40 are provided as separated devices, but a single device providing the functions of both devices could be used instead.

(5) In the embodiment hereinabove, the example of computers 10 and storage devices 50a, 50b being connected via an IP network, and an IP-SAN using the iSCSI communications format was described; however, implementation in storage networks using fiber channels or NAS would also be possible.

(6) In the embodiment hereinabove, a DHCP/TFTP server 20 is provided, but an arrangement without a DHCP/TFTP server 20 is possible, by instead storing the IP address for each computer and the disk-image management server 30 and network router 55 IP addresses on the computers 10. In this case, the network boot program could be stored, for example, on the disk-image management server 30, or on a computer 10.

(7) In the embodiment hereinabove, when migrating information stored on local disks of computers 10 to storage devices 50a, 50b, the information is copied; however, the migrating process could be accompanied by deletion of the information from the local disk.

While the computer system pertaining to the invention has been shown and described hereinabove through embodiments, the embodiments set forth herein are intended merely to aid in understanding of the invention, and should not be construed as limiting thereof. Various modifications and improvements thereto are possible without departing from the spirit of the invention, and such equivalents shall of course be considered to lie within scope of the invention.

For example, the invention may be realized in any of the following third to ninth aspects. The invention in a third aspect provides an information storing method for a storage device in a computer system, the system comprising a plurality of computers and a storage device shared by the plurality of computers. The information storing method for a storage device according to the third aspect comprises the steps of: formatting in said storage device a boot information storage area for storing boot information used to boot a computer, said information consisting of one or a plurality of files stored on one computer among said plurality of computers; allocating a unique identifier to each file making up the boot information stored in said computer and storing these in said boot information storage area; and reflecting the storage status of said boot information in said information storage area in disk-image management information.

According to the information storing method for a storage device pertaining to the third aspect, a boot information storage area for storing boot information used to boot a computer is created in a storage device, a unique identifier is allocated to each file making up the boot information stored in the computer, and status of the boot information in the information storage area is reflected in disk-image management information, whereby it is possible to format a boot information storage area for storing boot information, as well as uniquely identifying files that make up the boot information. As a result, storage efficiency of information of various kinds may be improved in a storage device connected to a plurality of computers.

The information storing method for a storage device pertaining to the third aspect may further comprise the steps of: formatting in said storage device an application information storage area for storing application information for executing an application, said information consisting of one or a plurality of files stored on one computer among said plurality of computers; allocating a unique identifier to each file making up the application information stored in said computer and storing these in said application information storage area; and reflecting the storage status of said application information in said information storage area in disk-image management information.

According to the information storing method for a storage device pertaining to the third aspect, an application information storage area for storing application information used for executing an application is created in a storage device, a unique identifier is allocated to each file making up the application information stored in the computer, and status of the application information in the information storage area is reflected in disk-image management information, whereby it is possible to format an application information storage area for storing application information, as well as uniquely identifying files that make up the application information. As a result, storage efficiency of information of various kinds may be improved in a storage device connected to a plurality of computers.

The invention in a fourth aspect thereof provides a computer system comprising a plurality of computers; and a storage device comprising a shared storage area for storing shared information to be shared by said plurality of computers, and an personal storage area for storing personal information to be used on an individual basis by each of said plurality of computers, said storage device being connected to said plurality of computers via a network. In the computer system pertaining to the fourth aspect, said computer comprises storage module for storing said shared information and said personal information; unregistered shared information extracting module that, in the event that there has been formatted in said storage device a shared storage area capable of storing shared information of the same type as said shared information being stored in said storage module, extracts from among said shared information being stored in said storage module shared information that is not currently stored in said shared storage area; and unregistered information storing module for requesting said storage device to store said extracted shared information and said personal information in said personal storage area.

According to the computer system of the fourth aspect, there are afforded working effects analogous to those of the information storing method to a storage device of the first aspect. The computer system of the fourth aspect, like the information storing method for a storage device pertaining to the first aspect, may be reduced to practice in various ways.

The invention in a fifth aspect thereof provides a computer system comprising a plurality of computers, a storage device shared by a plurality of computers, and an disk-image management device for administering information stored in the storage device. In the computer system pertaining to the fifth aspect, said storage device comprises a plurality of storage areas capable of storing boot information used to boot a computer, application information for executing an application on the computer, and personal information consisting of information characteristic of the operating environment of each computer; and control module for controlling read/write to said plurality of storage areas; said disk-image management device comprises storage device for storing storage area identifying information, said information identifying the storage area of information stored in said storage device; and said computers each comprise storage area identifying information acquiring module for acquiring from the storage device of said disk-image management device information for identifying the storage area of information stored in said storage device, and write request module that, on the basis of said acquired storage area identifying information, requests the control module of said storage device to write, from among said boot information and said application information stored in said computer, any information not currently stored in said storage device, and said personal information.

According to the computer system pertaining to the fifth aspect, a computer acquires from the storage device of the disk-image management device information for identifying the storage area of information stored in a storage device, and on the basis of the acquired storage area identifying information requests the control module of the storage device to write, from among boot information and application information stored in the computer, any information not currently stored in the storage device, and said personal information, whereby storage efficiency of information of various kinds may be improved in a storage device connected to a plurality of computers.

The invention in a sixth aspect thereof provides a computer system comprising a plurality of computers, a storage device shared by a plurality of computers, and an disk-image management device for administering information stored in the storage device. In the computer system pertaining to the sixth aspect, said storage device comprises a plurality of storage areas capable of storing boot information used to boot a computer, application information for executing an application on a computer, and personal information consisting of information characteristic of the operating environment of each computer; and control module for controlling read/write to said plurality of storage areas; and said disk-image management device comprises a storage module for storing storage area identifying information, said information identifying the storage area of information stored in said storage device; wherein said computer system further comprises a storage area identifying information acquiring portion for acquiring from the storage module of said disk-image management device information for identifying the storage area of information stored in said storage device, and a write request portion that, on the basis of said acquired storage area identifying information, requests the control portion of said storage device to write, from among said boot information and said application information stored in said computer, any information not currently stored in said storage device, and said personal information.

According to the computer system pertaining to the sixth aspect, an installer computer acquires from the storage module of the disk-image management device information for identifying the storage area of information stored in a storage device, and on the basis of the acquired storage area identifying information requests the control portion of the storage device to write, from among boot information and application information stored in the computer, any information not currently stored in the storage device, and said personal information, whereby storage efficiency of information of various kinds may be improved in a storage device connected to a plurality of computers.

The invention in a seventh aspect thereof provides a computer system comprising a plurality of computers; and one or a plurality of storage devices connected via a network to said plurality of computers and capable of storing boot information and application information shared by said plurality of computers. In the computer system pertaining to the seventh aspect, each of said plurality of computers comprises storage device for storing boot information used for booting, application information for executing an application, and personal information characteristic of the operating environment; unregistered boot information extracting module that, in the event that there has been formatted in said storage device a boot information storage area for storing said boot information, extracts from said boot information stored in said storage device boot information that is not currently stored in said storage device; unregistered application information extracting module that, in the event that there has been formatted in said storage device an application information storage area for storing said application information, extracts from said application information stored in said storage device application information that is not currently stored in said storage device; personal storage area creation requesting module for requesting said storage device to format a personal storage area for storing said personal information; and unregistered information storage requesting module for requesting storage of information not stored including said extracted boot information, application information, and personal information stored in said storage device, to said personal storage area in said storage device; and said storage device comprises storage area formatting module for formatting a said personal storage area in response to a request to format said personal storage area; and unregistered information storing device for storing said information not stored in said personal storage area in response to a request to store said information not stored.

According to the computer system pertaining to the seventh aspect, there are afforded working effects analogous to those of the information storing method to a storage device of the second aspect. The computer system of the seventh aspect, like the information storing method for a storage device pertaining to the second aspect, may be reduced to practice in various ways.

The invention in an eighth aspect thereof provides a method of controlling a computer in a computer system comprising a plurality of computers; and one or a plurality of storage devices capable of storing boot information and application information shared by one or a plurality of computers. The method of controlling a computer pertaining to the eighth aspect [comprises the steps of] acquiring identifying information identifying user information that is associated with a computer targeted for bootup, said user information including boot information to be used, application information, and personal information; using the acquired identifying information to connect to the boot information storage area in the relevant storage device and acquiring the boot information to be used; using the acquired boot information to boot the operating system and using the acquired identifying information to connect to an application information storage area in the relevant storage device; acquiring said application information to be used and using the acquired application information to run the application; using the acquired identifying information to connect to an personal storage area in the relevant storage device, and acquiring said personal information to be used; associating said personal storage area with said boot information storage area and associating said application information storage area with said boot information storage area; executing only read processes on said application information storage area and boot information storage area, while executing either read or write processes on said personal storage area.

According to the eighth aspect, a computer can be booted using boot information stored in a storage device, and an application can be executed in a computer, using application information stored in a storage device.

The invention in a ninth aspect thereof provides a computer system comprising a plurality of computers, a storage device shared by a plurality of computers, and an disk-image management device for administering information stored in the storage device. In the computer system pertaining to the ninth aspect, said storage device comprises a plurality of storage areas capable of storing boot information used to boot a computer, application information for executing an application on the computer, and personal information consisting of information characteristic of the operating environment of each computer; and read/write control module for executing reading from said application information storage area and said boot information storage area, and reading from or writing to said personal storage area; said disk-image management device comprises storage device for storing identifying information that identifies user information associated with a computer targeted for bootup, said user information including boot information to be used, application information, and personal information; and said computers each comprise identifying information acquiring module for acquiring said identifying information from said disk-image management device in accordance with a computer bootup request; boot information acquiring module that uses said acquired identifying information to acquire said boot information to be used, from the boot information storage area in the relevant storage device; application information acquiring module that uses said acquired identifying information to acquire said application information to be used, from the application information storage area in the relevant storage device; personal information acquiring module that uses said acquired identifying information to acquire said personal information to be used, from the personal storage area in the relevant storage device; bootup module that uses said acquired boot information and application information to bootup said operating system and application; and read/write requesting module for requesting the read/write control module in said storage device to read or write data.

According to the computer system pertaining to the ninth aspect, there are afforded working effects analogous to those of the method of controlling a computer pertaining to the eighth aspect. The computer system of the ninth aspect, like the method of controlling a computer pertaining to the eighth aspect, may be reduced to practice in various ways.

What is claimed is:

1. An information storing method for a storage device in a computer system that comprises a plurality of computers and a shared information storage device shared by the plurality of computers, said method comprising the steps of:
    determining whether a boot information storage area has been formatted in said storage device using disk-image management information that indicates storage status of information in said storage device, wherein the boot information storage area stores boot information used when booting a computer, wherein said boot information is stored on one computer among said plurality of computers;
    determining whether an application information storage area has been formatted in said storage device using said disk-image management information, wherein the application information storage area stores application information used for execution of an application by the computer, wherein the application information is stored on said one computer;
    formatting a personal storage area for storing personal information in said storage device, wherein the personal information is unique to an operating environment of each computer and is stored on said one computer;
    storing information that is stored in each said computer and is not currently stored in said boot information storage area in said personal storage area, if said boot information storage area has been formatted;
    storing information that is stored in each said computer and is not currently stored in said application information storage area in said personal storage area, if said application information storage area has been formatted;
    storing said personal information in said formatted personal storage area; and
    reflecting in said disk-image management information the storage status of information in said storage areas.

2. The information storing method according to claim 1 further comprising the steps of:
    formatting the boot information storage area in said storage device, if the boot information storage area has not been formatted in said storage device;
    storing said boot information stored on said one computer in said formatted boot information storage area; and
    reflecting in said disk-image management information the storage status of said boot information stored in said boot information storage area.

3. The information storing method according to claim 2 further comprising the steps of:
    formatting the application information storage area for storing application information stored on said one computer in said storage device, if the application information stored on said one computer is not currently stored in said storage device;
    storing said application information in said formatted application information storage area; and
    reflecting in said disk-image management information the storage status of application boot information stored in said application information storage area.

4. The information storing method according to claim 3, wherein said information is composed of one or a plurality of files;
    wherein said information storing method further comprises the step of, when storing said boot information and said application information in said boot information storage area and said application information storage area, respectively, allocating a unique identifier to each file making up said boot information and said application information, respectively;
    wherein extraction of information not currently stored in said boot information storage area and said application information storage area from boot information and application information stored on each said computer is carried out in file units using said identifiers;
    and wherein storing of said various sets of information is carried out by means of copying or moving in said file units the various information stored on each said computer.

5. The information storing method according to claim 3 further comprising the steps of:
    identifying a boot information storage area where boot information to be updated is being stored;
    storing said boot information to be updated in said identified boot information storage area; and
    reflecting in said disk-image management information the storage status of said boot information to be updated in said identified boot information storage area.

6. The information storing method according to claim 3 further comprising the steps of:
    identifying an application information storage area where application information to be updated is being stored;
    storing said application information to be updated in said identified application information storage area; and
    reflecting in said disk-image management information the storage status of said application information to be updated in said identified application information storage area.

7. The information storing method according to claim 6, wherein said steps are executed by each of said plurality of computers.

8. The information storing method according to claim 6, wherein said computer system comprises an installer computer storing information for said storage device, and
wherein said steps are executed by said installer computer.

9. The information storing method according to claim 8, wherein said computer system comprises a plurality of storage devices;
wherein said information storing method further comprises the step of associating one storage device among said plurality of storage devices with one computer among said plurality of computers;
and wherein said steps are executed between said associated one storage device and one storage device.

10. A computer system comprising:
a plurality of computers;
a storage device shared by said plurality of computers; and
a disk-image management device for administering information stored in said storage device;
wherein said storage device comprises:
a plurality of storage areas capable of storing boot information used to boot said computers, application information for executing an application on said computers, and personal information consisting of information characteristic of an operating environment of each of said computers; and
a controller for controlling read/write to said plurality of storage areas;
wherein said disk-image management device comprises a storage module for storing storage area identifying information, said identifying information identifying a storage area for information stored in said storage device;
and wherein each said computer acquires from the storage module of said disk-image management device the identifying information identifying a storage area of information being stored in said storage device, and on the basis of said acquired storage area identifying information, requests the controller of said storage device to write, from among said boot information and said application information stored on said computer, any information not currently stored in said storage device, and said personal information.

11. The computer system according to claim 10,
wherein each said computer determines whether in said storage device a said storage area has been allocated to each of said boot information, said application information, and said personal information; and if said storage area has not been allocated to any information of said boot information, said application information, and said personal information, requests said controller to allocate a storage area for storing information currently having no said storage area allocated;
wherein said controller, in response to said request, executes allocation of a storage area for storing said currently unallocated information; and
wherein said disk-image management device stores the relationship between the information newly allocated by said controller and said storage area in said storage module.

12. A computer system comprising:
a plurality of computers;
a storage device shared by the plurality of computers;
a disk-image management device for administering information stored in said storage device; and
an installer computer;
wherein said storage device comprises:
a plurality of storage areas capable of storing boot information used to boot said computers, application information for executing an application on said computers, and personal information consisting of information characteristic of an operating environment of each of said computers; and
a controller for controlling read/write to said plurality of storage areas;
wherein said disk-image management device comprises a storage module for storing storage area identifying information, said identifying information identifying a storage area for information stored in said storage device;
wherein said installer computer acquires from the storage module of said disk-image management device the identifying information identifying a storage area of information being stored in said storage device: on the basis of said acquired storage area identifying information, determines whether a said storage area has been allocated in said storage device to all of the information consisting of said boot information, said application information, and said personal information for one computer among said plurality of computers; and requests the controller of said storage device to write, from among said boot information and said application information stored on said one computer, any information not currently stored in said storage device, and said personal information;
wherein said controller, in response to said request, executes allocation of a storage area for storage of said unallocated information;
and wherein said disk-image management device stores the relationship between the information newly allocated by said controller and said storage area in said storage module.

13. An information storing method for a storage device that is connected with a plurality of computers via a network in which the storage device is shared by said plurality of computers, comprising:
administering information stored in said storage device in a disk-image management device;
storing in said storage device boot information used to boot said computers, application information for executing an application on said computers, and personal information consisting of information characteristic of an operating environment of each of said computers;
controlling read/write to a plurality of storage areas with a controller;
storing in a storage module of said disk-image management device, storage area identifying information, said identifying information identifying a storage area for information stored in said storage device;
and acquiring from the storage module of said disk-image management device the identifying information identifying a storage area of information being stored in said storage device, and on the basis of said acquired storage area identifying information, requesting the controller of said storage device to write, from among said boot information and said application information stored on said computer, any information not currently stored in said storage device, and said personal information.

* * * * *